United States Patent
Kaneda et al.

(10) Patent No.: US 9,041,828 B2
(45) Date of Patent: May 26, 2015

(54) IMAGING APPARATUS, IMAGING METHOD, IMAGE PROCESSING APPARATUS, AND IMAGE PROCESSING METHOD FOR A SET EXECUTION CONDITION

(75) Inventors: Yuji Kaneda, Kawasaki (JP); Katsuhiko Mori, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 418 days.

(21) Appl. No.: 13/207,550

(22) Filed: Aug. 11, 2011

(65) Prior Publication Data
US 2012/0075500 A1 Mar. 29, 2012

(30) Foreign Application Priority Data
Aug. 17, 2010 (JP) ................................. 2010-182589

(51) Int. Cl.
H04N 5/232 (2006.01)

(52) U.S. Cl.
CPC ....... *H04N 5/23293* (2013.01); *H04N 5/23219* (2013.01); *H04N 5/23222* (2013.01)

(58) Field of Classification Search
None
See application file for complete search history.

(56) References Cited

U.S. PATENT DOCUMENTS

| | | | |
|---|---|---|---|
| 5,878,156 A | 3/1999 | Okumura | |
| 6,088,040 A | 7/2000 | Oda et al. | |
| 7,440,621 B2 | 10/2008 | Iguchi et al. | |
| 7,532,745 B2 | 5/2009 | Inoue | |
| 8,311,293 B2 | 11/2012 | Okada | |
| 2007/0159309 A1* | 7/2007 | Ito et al. | 340/425.5 |
| 2008/0309796 A1 | 12/2008 | Abe | |
| 2010/0245614 A1* | 9/2010 | Matsunaga | 348/222.1 |

FOREIGN PATENT DOCUMENTS

| | | |
|---|---|---|
| JP | 10-091808 A | 4/1998 |
| JP | 2000-137789 A | 5/2000 |
| JP | 3350296 B | 11/2002 |
| JP | 2005-056388 A | 9/2005 |
| JP | 2005-266984 A | 9/2005 |
| JP | 2008-210239 A | 9/2008 |
| JP | 4161659 B | 10/2008 |
| JP | 2008-311819 A | 12/2008 |
| JP | 2010-061465 A | 3/2010 |
| JP | 2010-199883 A | 9/2010 |

OTHER PUBLICATIONS

P. Felzenszwalb, et al., "A Discriminatively Trained, Multiscale, Deformable Part Model" (Proceedings of the IEEE CVPR, 2008).
Y. Mitarai, et al., "Robust Face Detection System Based on Convolutional Neural Networks Using Selective Activation of Modules" (FIT (Forum on Information Technology), LI-013, 2003).
P. Viola, et al, "Rapid Object Detection using a Boosted Cascade of Simple Features" (Proc. of CVPR, vol. 1, pp. 511-518, Dec. 2001).

* cited by examiner

*Primary Examiner* — Albert Cutler
(74) *Attorney, Agent, or Firm* — Fitzpatrick, Cella, Harper & Scinto

(57) ABSTRACT

The present invention facilitates the setting of a condition for the execution of predetermined processing and enables the execution of processing conforming to a user's intention. In an image processing apparatus, a predetermined object is detected in an image selected based on an instruction from a user, a determination is made regarding an attribute of the detected object, and the determined attribute is set as an execution condition used when executing predetermined processing on an image.

9 Claims, 19 Drawing Sheets

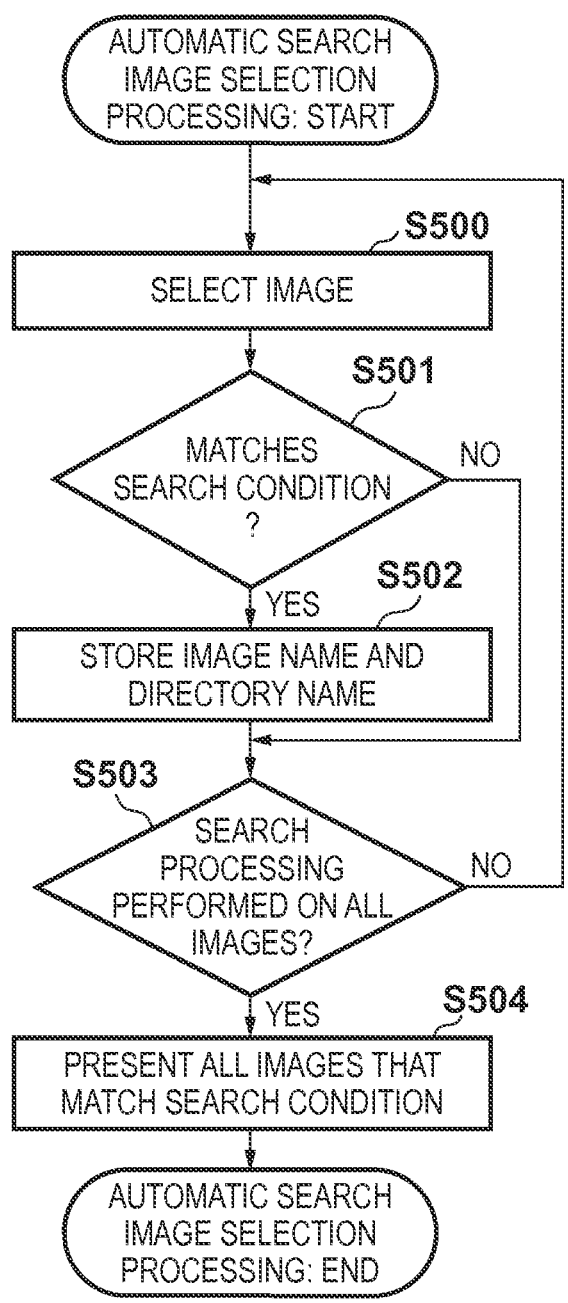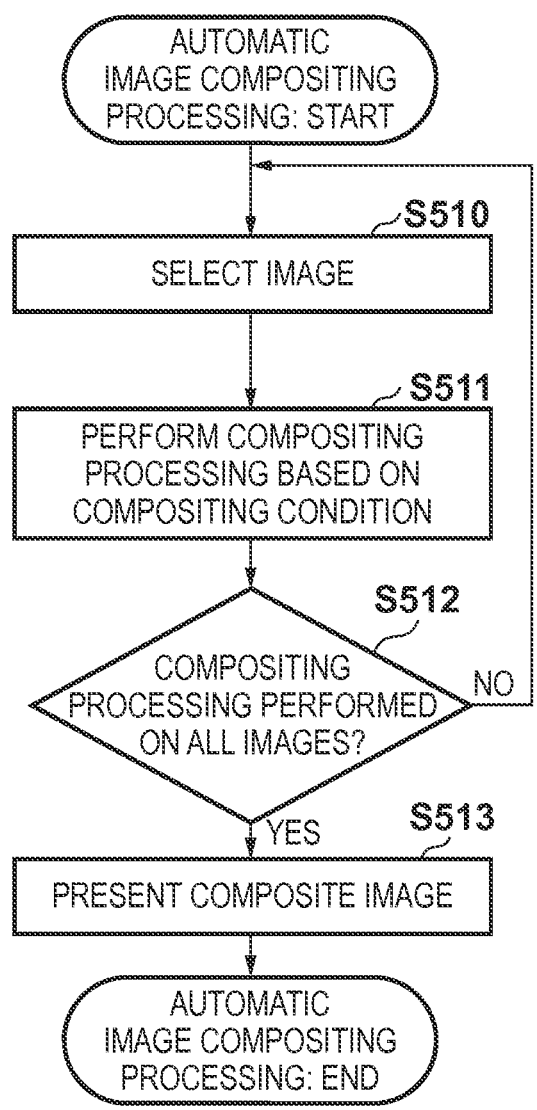

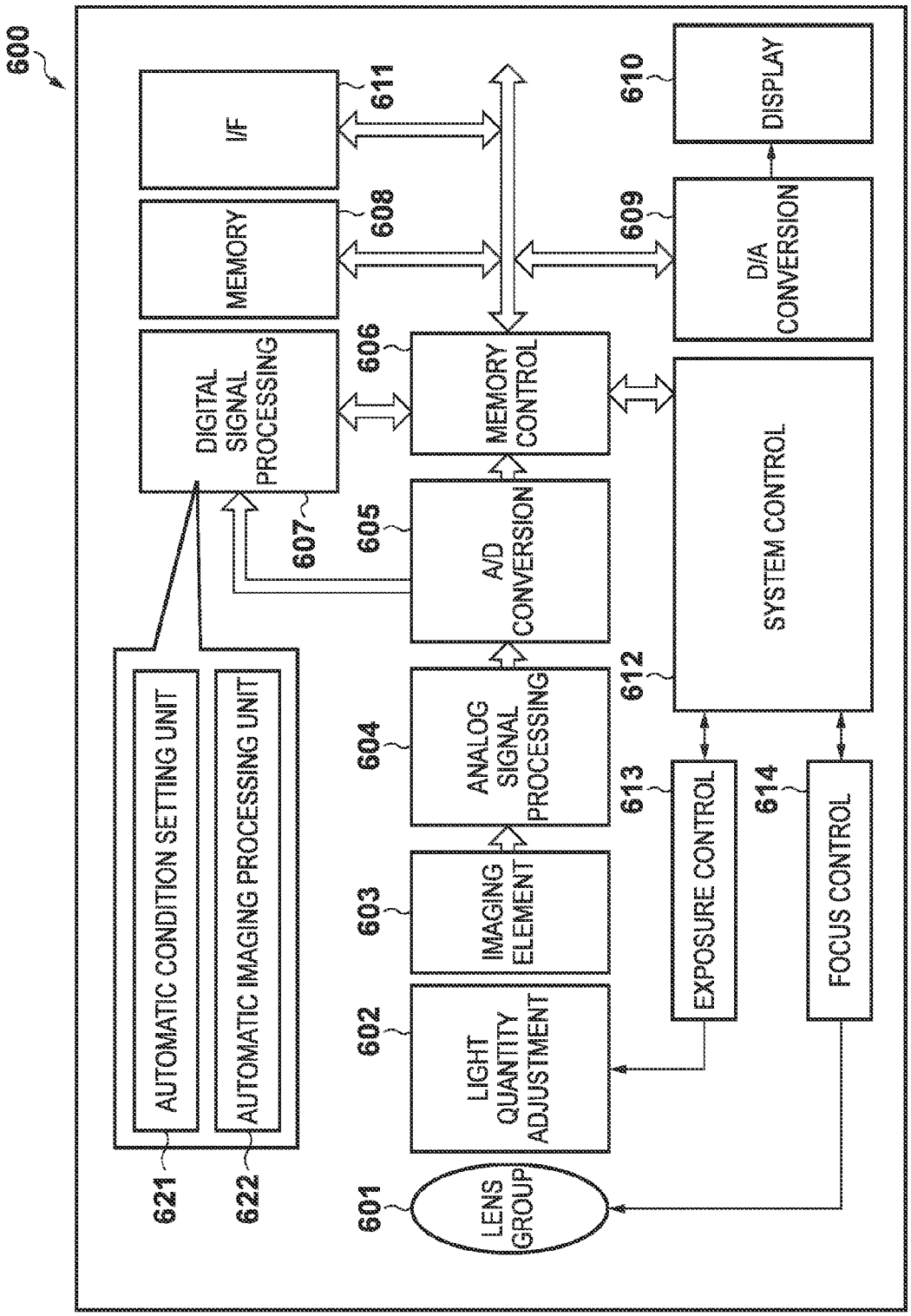

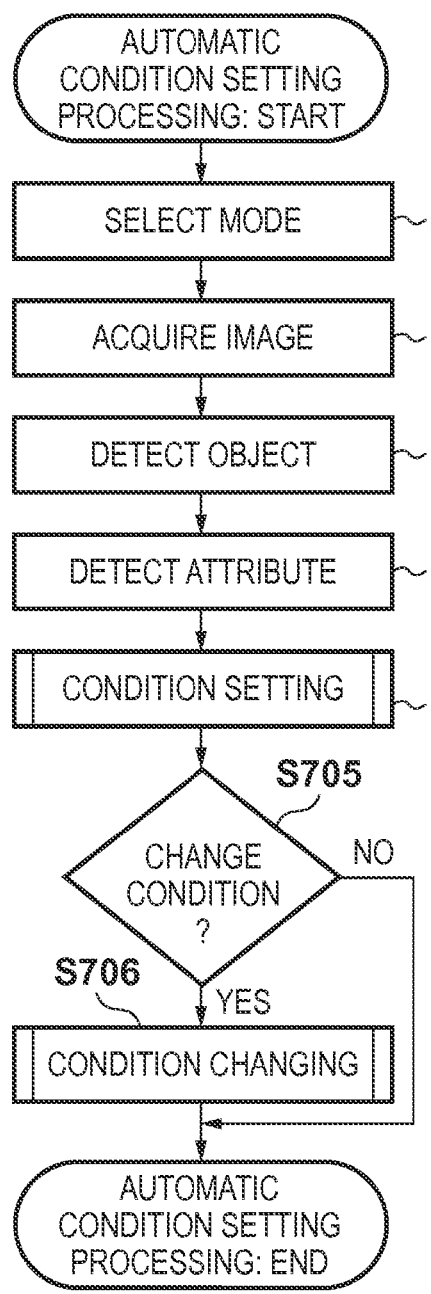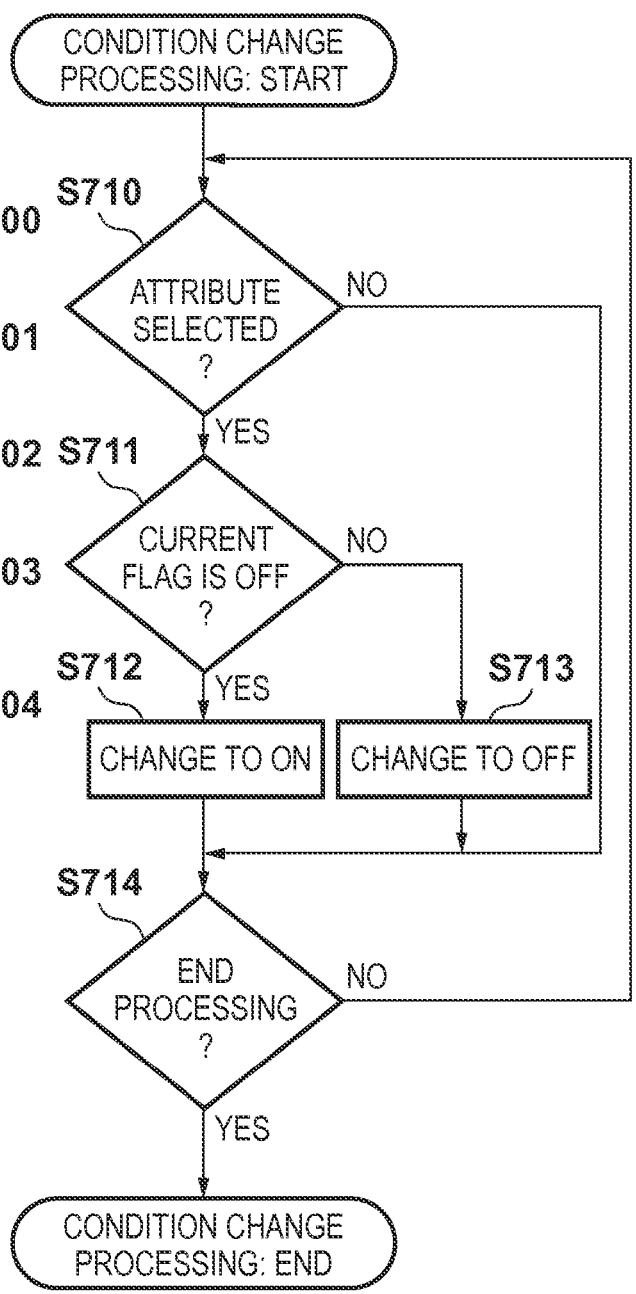
FIG. 7A
FIG. 7B

FIG. 19
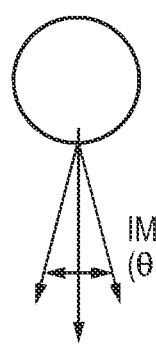
SUBJECT
IMAGING RANGE
($\theta p \pm \delta\theta p$)
DETECTED LINE
OF SIGHT DIRECTION $\theta p$
NORMAL DIRECTION
OF IMAGING AREA
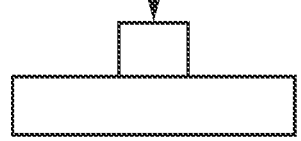
IMAGING APPARATUS
90°  −90°

IMAGING APPARATUS, IMAGING METHOD, IMAGE PROCESSING APPARATUS, AND IMAGE PROCESSING METHOD FOR A SET EXECUTION CONDITION

BACKGROUND OF THE INVENTION

1. Field of the Invention

The present invention relates to image processing technology, especially for setting execution condition for executing a predetermined processing.

2. Description of the Related Art

Conventionally, there is known to be imaging processing technology for detecting feature points such as a person's eyes and mouth in an image, determining whether the person is smiling based on the arrangement relationship between the detected feature points, and performing imaging if it has been determined that the person is smiling (e.g., see Japanese Patent Laid-Open No. 2005-266984). There is also known to be imaging processing technology for making a determination regarding the person's smile level, and performing imaging if it has been determined that the smile level has reached a predetermined level set in advance by a user (e.g., see Japanese Patent Laid-Open No. 2008-311819).

In this way, in an imaging apparatus configured such that imaging processing is executed if a predetermined execution condition has been satisfied, the user needs to set the execution condition (imaging condition) for executing imaging processing in advance.

However, the imaging condition is not limited to merely "smiling" and the "level" thereof, but rather includes various setting items such as "eyes are open" and "line of sight direction matches normal direction of imaging area". Even with the same item "smiling", the "level" of smiling needs to be further changed depending on the gender of the subject, such as in the case of setting "smiling with mouth open" as an imaging condition for men, and setting "classy smile with mouth closed" as an imaging condition for women.

In this way, the imaging condition includes various setting items, and even with the same setting item, the optimum value changes depending on the situation, and therefore imaging condition setting is a very large burden on the user with an imaging apparatus such as that described above.

Also, when setting an optimum value for a predetermined setting item, it is not easy for the user to express an intended image (the image to be captured) using words, numbers, and the like. For example, if there were the three options "high", "medium", and "low" when setting the smile level, it would be very difficult to determine to which smile "level" the item "classy smile with mouth closed" would correspond. For this reason, the captured image may as a result differ from the image the user intended to capture.

For such reasons, there is desire for an imaging apparatus that facilitates the setting of an imaging condition and furthermore enables the execution of imaging processing conforming to an image intended by the user. Also, if execution condition setting is facilitated, and processing conforming to an image intended by the user is executed, it is conceivable for the present invention to be applicable to not only imaging processing, but also, for example, a search condition for searching for an image, or a compositing condition for compositing images. In other words, the present invention can be applied to the setting of an execution condition for various types of processing.

SUMMARY OF THE INVENTION

The present invention has been achieved in view of the above-described issues.

An image processing apparatus according to the present invention has the following configuration. Specifically, an image processing apparatus according to the present invention includes: a detection unit configured to detect a predetermined object in an image selected based on an instruction from a user; a determination unit configured to determine an attribute of the detected object; and a condition setting unit configured to set the determined attribute as an execution condition for execution of predetermined processing on the image.

The present invention facilitates the setting of an execution condition used in the execution of predetermined processing, and enables executing processing conforming to a user's intention.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5A is a flowchart showing the flow of automatic search image selection processing.

FIG. 5B is a flowchart showing the flow of automatic image compositing processing.

FIG. 6 is a diagram showing an overall configuration of an imaging apparatus according to an embodiment of the present invention.

FIG. 7A is a flowchart showing the flow of automatic condition setting processing.

FIG. 7B is a flowchart showing the flow of condition change processing.

FIG. 19 is a diagram showing the normal direction of an imaging area, a detected line of sight direction, and a predetermined range of line of sight directions that has been set.

DESCRIPTION OF THE EMBODIMENTS

Embodiments of the present invention will now be described in detail in accordance with the accompanying drawings.

First Embodiment

1. Overall Configuration of Image Processing Apparatus

Figure 1:
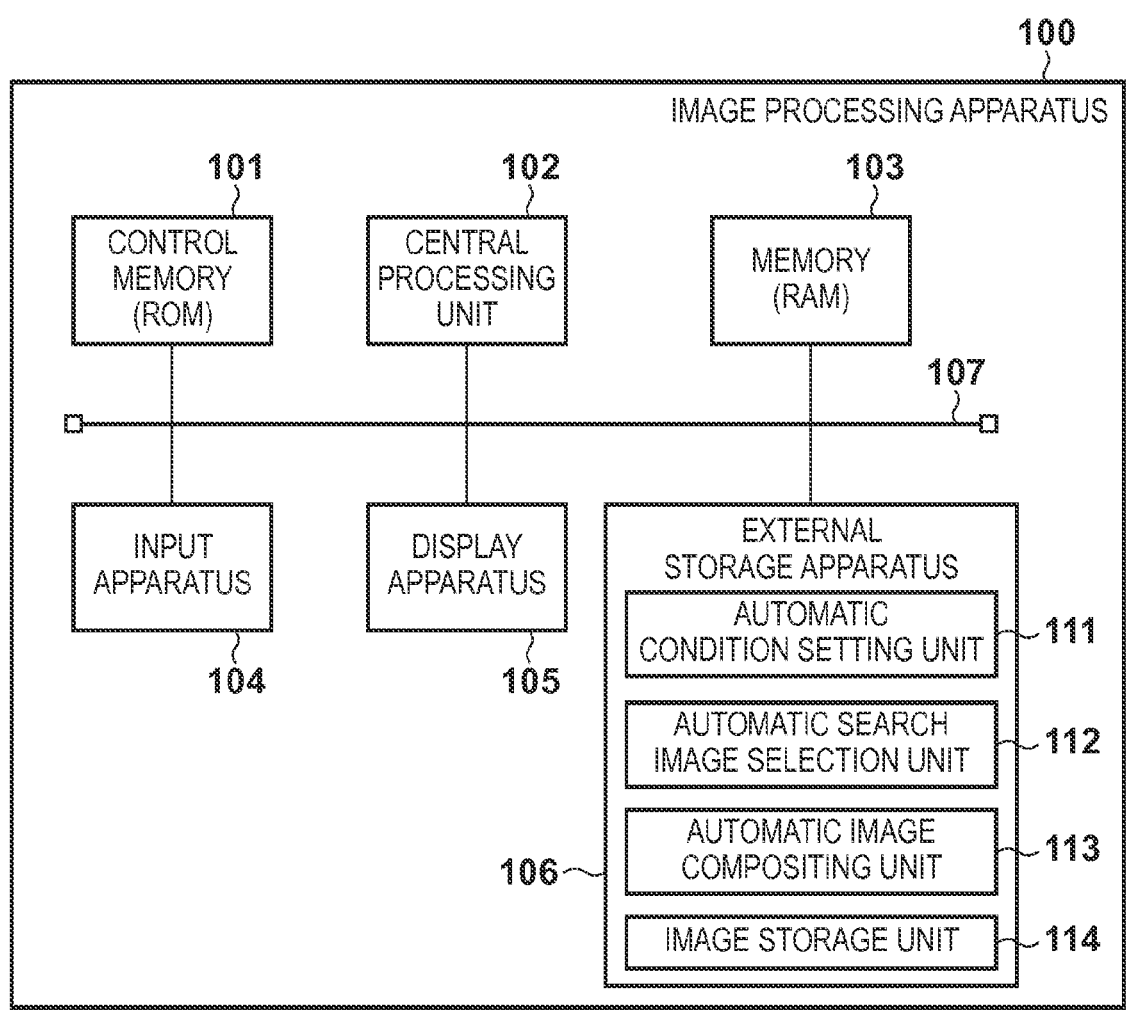
FIG. 1 is a diagram showing an overall configuration of an image processing apparatus according to an embodiment of the present invention.

FIG. 1 is a diagram showing the overall configuration of an image processing apparatus 100 according to an embodiment of the present invention. As shown in FIG. 1, the image processing apparatus 100 includes a control memory (ROM) 101, a central processing unit 102, a memory (RAM) 103, an input apparatus 104, a display apparatus 105, and an external storage apparatus 106.

The external storage apparatus 106 includes an image storage unit 114 that stores image data, and a control program for processing the image data stored in the image storage unit 114 (or image data stored on another storage medium that is not shown). Under control of the central processing unit 102, the control program and image data are retrieved as necessary from the memory 103 via a bus 107, and the control program is executed by the central processing unit 102. Accordingly, the control program functions as an automatic condition setting unit 111, an automatic search image selection unit 112, and an automatic image compositing unit 113.

2. Functional Configuration of Automatic Condition Setting Unit

Next is a description of the functional configuration of the automatic condition setting unit 111 in the image processing apparatus 100. The automatic condition setting unit 111 automatically sets an execution condition for executing predetermined processing, such as a search condition for searching for an image or a compositing condition for compositing images, based on an image designated by a user.

Figure 2:
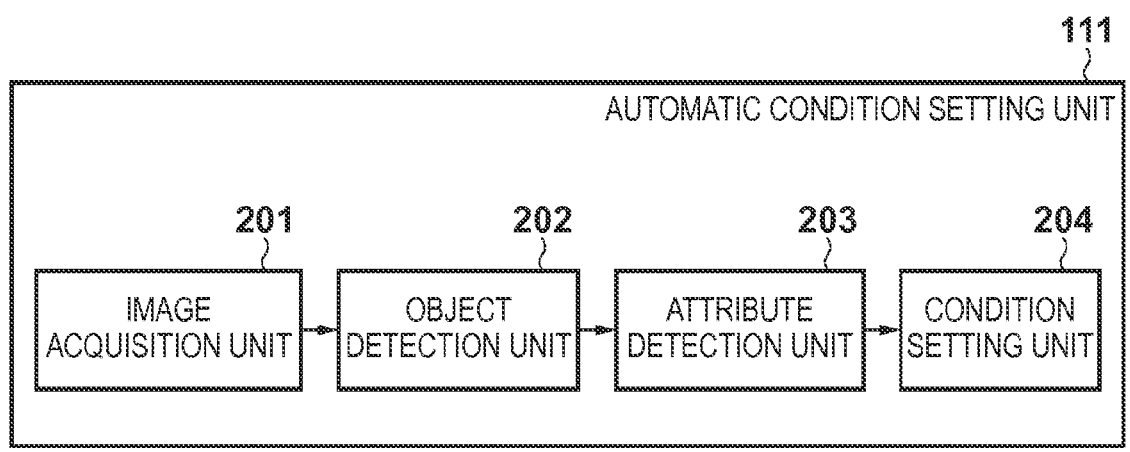
FIG. 2 is a diagram showing a functional configuration of an automatic condition setting unit.

FIG. 2 is a diagram showing the functional configuration of the automatic condition setting unit 111. As shown in FIG. 2, the automatic condition setting unit 111 includes an image acquisition unit 201, an object detection unit 202, an attribute detection unit 203, and a condition setting unit 204.

The image acquisition unit 201 acquires an image to be used in the automatic setting of an execution condition such as a search condition or a compositing condition from the external storage apparatus 106 or another storage medium (e.g., a memory, a floppy (registered trademark) disk, a hard disk, a magnetic tape, a magneto-optical disk, or a nonvolatile memory card).

The object detection unit 202 detects a target object in at least one of the images acquired by the image acquisition unit 201. Note that as one example of a technique for detecting an arbitrary object in an image, there is a technique employing a luminance gradient histogram. Note that details of a technique employing a luminance gradient histogram are disclosed in, for example, "A Discriminatively Trained, Multiscale, Deformable Part Model" by P. Felzenszwalb, D. McAllester, D. Ramanan, et al. (Proceedings of the IEEE CVPR, 2008).

In the present embodiment, the object detection unit 202 detects a person's face as the target object. Note that examples of a technique for detecting a person's face as a target object include a technique employing a neural network and a technique combining simple rectangular filters. A technique employing a neural network is disclosed in, for example, "Robust Face Detection System Based on Convolutional Neural Networks Using Selective Activation of Modules" by Yusuke Mitarai, Katsuhiko Mori, and Masakazu Matsugu (FIT (Forum on Information Technology), L1-013, 2003). Also, a technique combining simple rectangular filters is disclosed in, for example, "Rapid Object Detection using a Boosted Cascade of Simple Features" by P. Viola, M. Jones, et al, (Proc. Of CVPR, vol. 1, pp. 511-518, December, 2001).

Note that the target object detected by the object detection unit 202 is not limited to be a person's face, and may be, for example, a person's body or an animal such as a dog or a cat.

The attribute detection unit 203 detects an attribute of the target object detected by the object detection unit 202. In the present embodiment, a person's face is detected as the target object, and therefore the attribute detection unit 203 detects a facial attribute.

The facial attribute may be, for example, a facial expression such as a smile, sad face, or angry face; line of sight direction or face orientation; open/closed eyes; or a name specifying a person. In other words, the attribute detection unit 203 executes, on the face detected by the object detection unit 202, determination processing regarding an expression such as a smile, sad face, or angry face, determination processing regarding the line of sight direction, determination processing regarding the face orientation, determination processing regarding open/closed eyes, determination processing regarding a name specifying a person, or the like. The following describes an outline of the processing content of the above determination processing.

In expression determination processing, the likelihood of an expression (feature amount) is calculated based on an amount of change from a pre-provided reference image (e.g., see Japanese Patent Laid-Open No. 2005-56388), and threshold value processing for comparing the calculated likelihood of an expression with a pre-provided threshold value is performed. A determination regarding the facial expression is then made by making, for example, a binary determination between smiling and not-smiling.

In the line of sight direction determination processing, a determination regarding the line of sight direction is made using the positions (feature amounts) of feature points such as the pupils and the eyes. In the face orientation determination processing, a determination regarding the orientation of the face is facing is made using feature sites such as the eyes and mouth. Note that details regarding line of sight direction determination processing and face orientation determination processing are disclosed in Japanese Patent Laid-Open No. 2008-210239, for example.

In the open/closed eyes determination processing, a determination regarding open/closed eyes is made by calculating a change in area ratio or change in distance (feature amount) between the eyebrows and the eyes, and performing threshold value processing for comparing the calculated value with a pre-provided threshold value (e.g., see Japanese Patent No. 3350296).

In the determination processing regarding a name specifying a person, a determination regarding a name in a registered dictionary is made using the distance (feature amount) between patterns of multiple partial areas in the input image and a registered image (e.g., see Japanese Patent No. 4161659).

Note that the processing content of the expression determination processing, the line of sight direction determination processing, the face orientation determination processing, the open/closed eyes determination processing, and the determination processing regarding a name specifying a person is not limited to employing the techniques described above, and processing content using other techniques may be employed. Also, the determination processing executed by the attribute detection unit 203 is not limited to the determination processing described above, and other determination processing may be executed.

Note that if the target object detected by the object detection unit 202 is a person's body, the attribute detection unit 203 detects a posture or the like as an attribute of the target object. Also, if the target object that was detected is an animal such as a dog or a cat, the attribute detection unit 203 detects a facial expression, a line of sight direction, a facial type or the like as an attribute of the target object.

The condition setting unit 204 automatically sets an execution condition such as a search condition for searching for an image or a compositing condition for compositing images, based on the target object attributes detected by the attribute detection unit 203. For example, the condition setting unit 204 is provided in advance with a table with pairs of an attribute and a flag indicating whether the attribute was detected (ON/OFF), and sets the flags corresponding to detected attributes to ON.

For example, if smiling was detected as a result of the expression determination processing, the flag corresponding to that attribute (facial expression attribute) is set to ON. Also, if it was determined that the line of sight direction matches the normal direction from the camera imaging area as a result of the line of sight direction determination processing, the flag corresponding to that attribute (eye line of sight direction attribute) is set to ON. Furthermore, if it has been determined that the eyes are open as a result of the open/closed eyes determination processing, the flag corresponding to that attribute (open/closed eyes attribute) is set to ON. Moreover, if it has been determined that the target object is person A as a result of the determination processing regarding a name specifying a person, the flag corresponding to that attribute (name attribute) is set to ON. In the case of a determination processing result other than those described above, the flag of the corresponding attribute is set to ON.

3. Flow of Automatic Condition Setting Processing

Figure 3:
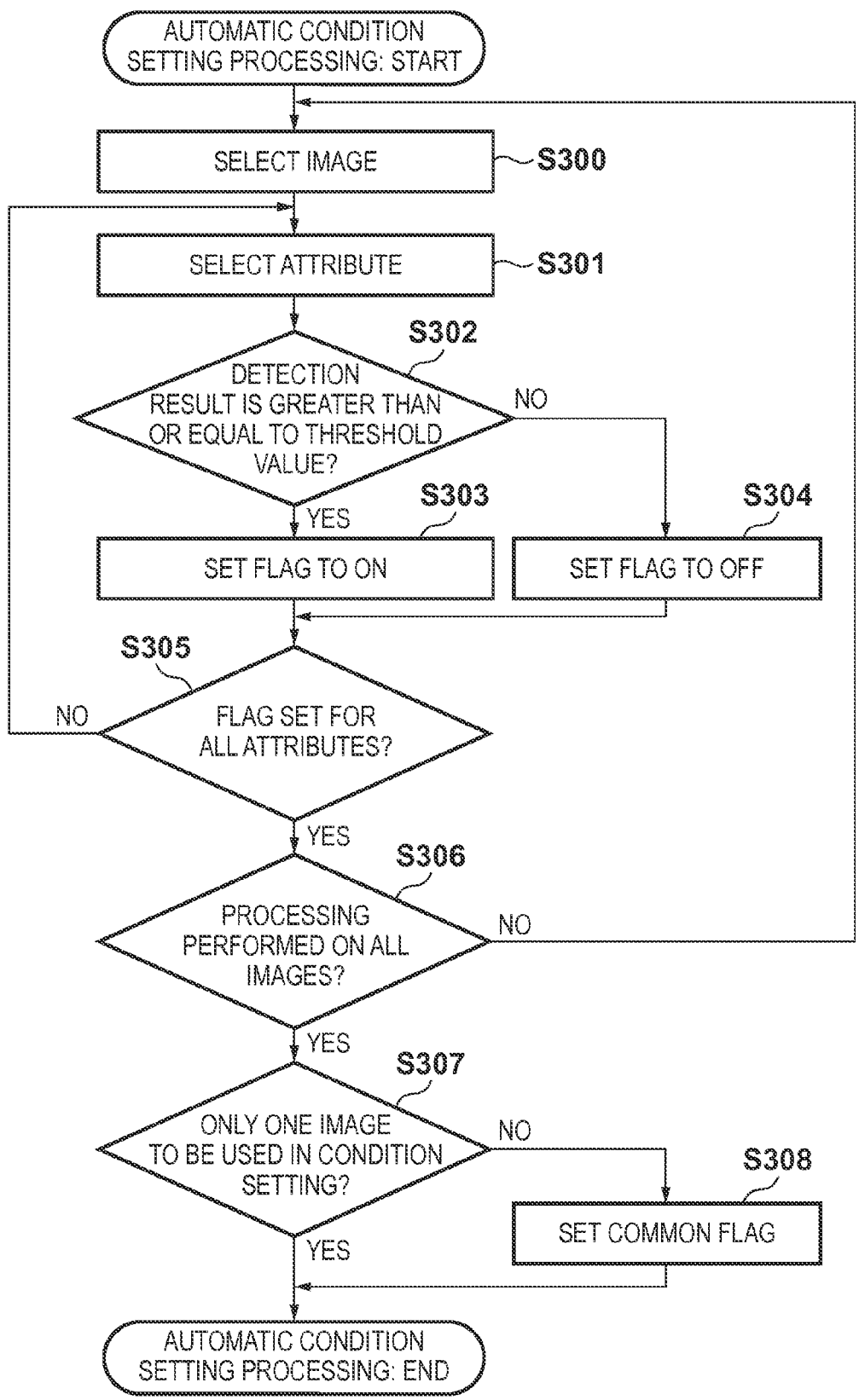
FIG. 3 is a flowchart showing the flow of automatic condition setting processing.

Next is a description of the flow of automatic condition setting processing performed by the automatic condition setting unit 111 with reference to FIG. 3. FIG. 3 is a flowchart showing the flow of automatic condition setting processing.

As shown in FIG. 3, when the automatic condition setting processing starts, in step S300 one or more images are selected from among images that were acquired by the image acquisition unit 201 based on a selection instruction from the user. Specifically, the acquired one or more images are images that the user selected, as images to be searched for, from among images displayed on the display apparatus 105.

In step S301, after the attribute detection unit 203 has performed attribute detection on the images selected in step S300, one of the detected attributes is selected.

In step S302, the detection result obtained by the attribute detection unit 203 for the attribute selected in step S301 is compared with a pre-provided threshold value, and it is determined whether the detection result is greater than or equal to the threshold value. If it has been determined that the determination result is greater than or equal to the threshold value, the procedure advances to step S303, in which the flag corresponding to the attribute selected in step S301 is set to ON. However, if it has been determined that the determination result is not greater than or equal to the threshold value, the procedure advances to step S304, in which the flag corresponding to the attribute selected in step S301 is set to OFF.

In step S305, it is determined whether flag setting has been performed for all of the attributes detected by the attribute detection unit 203, and the procedure advances to step S306 if it has been determined that flag setting has been performed for all of the attributes. However, if it has been determined that there is an attribute for which flag setting has not been performed, the procedure returns to step S301, an attribute for which flag setting has not been performed is selected, and the above-described processing is executed.

In step S306, it is determined whether the above-described processing has been executed for all of the images acquired by the image acquisition unit 201, and the procedure advances to step S307 if it has been determined that the above-described processing has been executed for all of the images. However, if it has been determined that there is an image for which the above-described processing has not been executed, the procedure returns to step S300, the next image is selected, and the above-described processing is executed.

In step S307, it is determined whether only one image was acquired by the image acquisition unit 201. If it has been determined that only one image was acquired by the image acquisition unit 201, the automatic condition setting processing is ended.

However, if it has been determined that more than one image was acquired by the image acquisition unit 201, the flags of the attributes of all of the images acquired by the image acquisition unit 201 are referenced, and a common flag is set to ON for an attribute whose flag is ON in all of the images.

For example, in the case where the image acquisition unit 201 acquires two images, the smiling flag among the attributes of the first image is ON, and the smiling flag among the attributes of the second image is OFF, the common flag is set to OFF. Note that the processing for setting a common flag in the case where it has been determined that more than one image was acquired by the image acquisition unit 201 is not limited to this. For example, a configuration is possible in which the ratio of the number of images in which a flag is ON to the number of images acquired by the image acquisition unit 201 is calculated, and a common flag is set based on the calculation result. Specifically, a configuration is possible in which, in the case where ten images were acquired by the image acquisition unit 201, a common flag is set to ON if the smiling flag is ON for eight or more images.

In this way, the configuration is such that in the setting of an execution condition such as a search condition or a compositing condition, automatic setting is performed based on multiple attributes detected in images designated by the user, rather than settings being manually set individually, thus enabling significantly reducing the burden of the setting operations performed by the user.

4. Functional Configuration of Automatic Search Image Selection Unit

Next is a description of the automatic search image selection unit that applies an execution condition set by automatic condition setting processing as a search condition, and searches for an image from the image storage unit 114 or another storage medium. Note that examples of the other storage medium referred to here include a memory, a floppy (registered trademark) disk, a hard disk, a magnetic tape, a magneto-optical disk, and a nonvolatile memory card.

Figure 4A:
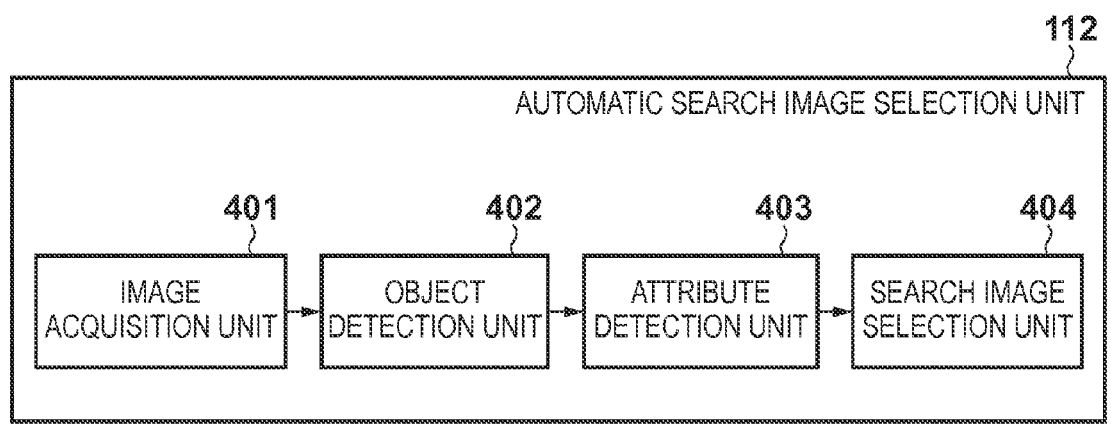
FIG. 4A is a diagram showing a functional configuration of an automatic search image selection unit.

FIG. 4A is a diagram showing the functional configuration of the automatic search image selection unit 112 that automatically selects a search image based on a search condition automatically set by the automatic condition setting unit 111.

As shown in FIG. 4A, the automatic search image selection unit 112 includes an image acquisition unit 401, an object detection unit 402, an attribute detection unit 403, and a search image selection unit 404.

The image acquisition unit 401 acquires an image to be used in the selection of a search image from the image storage unit 114 or another storage medium (e.g., a memory, a floppy (registered trademark) disk, a hard disk, a magnetic tape, a magneto-optical disk, or a nonvolatile memory card).

The object detection unit 402 executes target object detection on the image acquired by the image acquisition unit 401.

The attribute detection unit 403 detects an attribute of the target object detected by the object detection unit 402. In the present embodiment, in order to detect a person's face as the target object, the attribute detection unit 403 detects a facial attribute. Note that as described above, the facial attribute may be, for example, a facial expression such as a smile, sad face, or angry face; line of sight direction or face orientation; open/closed eyes; or a name specifying a person. A detailed description of the target object detection method and the attribute detection method will not be given here since they have already been described.

The search image selection unit 404 selects an image based on the result of the detection performed by the attribute detection unit 403 and the search condition set by the automatic condition setting unit 111.

5. Flow of Automatic Search Image Selection Processing

Next is a description of the flow of automatic search image selection processing performed by the automatic search image selection unit 112 with reference to FIG. 5A. FIG. 5A is a flowchart showing the flow of automatic search image selection processing.

As shown in FIG. 5A, when the automatic search image selection processing starts, in step S500 one or more images that satisfy a condition are selected from among search target images. For example, if the target object is a person's face, images including a person's face are set as the search target images, and one or more images are selected from among these search target images. If the target object is a dog, images including a dog are set as the search target images, and one or more images are selected from among these search target images.

In step S501, it is determined whether the images selected in step S500 match the search condition set by the automatic condition setting unit 111. Specifically, it is determined whether the images match the search condition by referencing the attribute flags set by the automatic condition setting unit 111.

If it has been determined that an image matches the search condition set by the automatic condition setting unit 111, the procedure advances to step S502, in which the name of the image that matches the search condition and a directory name are stored. However, if it has been determined that the image does not match the search condition set by the automatic condition setting unit 111, the procedure advances to step S503.

In step S503, it is determined whether the above-described processing has been executed on all of the search target images. If it has been determined that the above-described processing has been performed on all of the search target images, the procedure advances to step S504. However, if it has been determined that there is an image for which the above-described processing has not been executed, the procedure returns to step S500, and the next image is selected.

In step S504, all of the images that match the search condition are displayed by thumbnail display or the like, and the automatic search image selection processing is ended.

6. Functional Configuration of Automatic Image Compositing Unit

Next is a description of the functional configuration of the automatic image compositing unit that applies an execution condition set by the automatic condition setting unit as the compositing condition, acquires images from the image storage unit 114 or another storage medium, and generates a composite image.

Figure 4B:
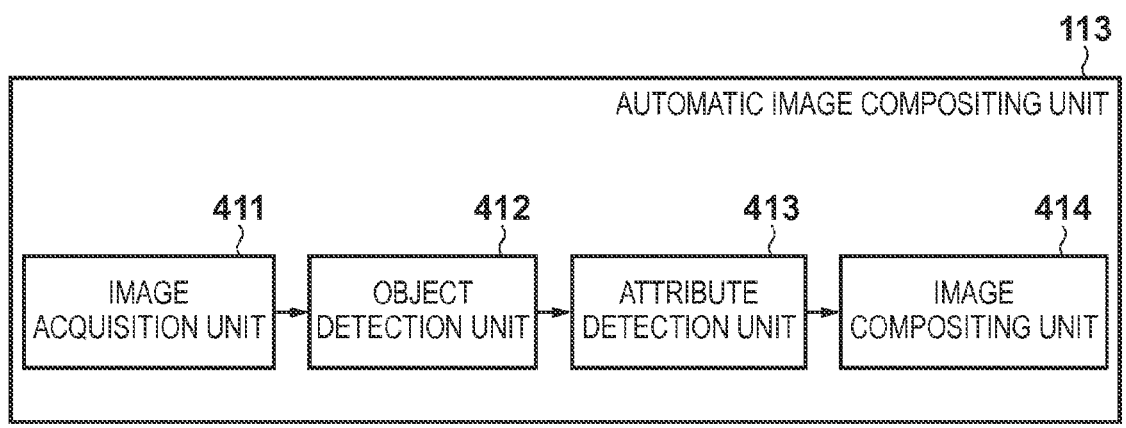
FIG. 4B is a diagram showing a functional configuration of an automatic image compositing unit.

FIG. 4B is a diagram showing the functional configuration of the automatic image compositing unit 113 that generates a composite image based on a compositing condition automatically set by the automatic condition setting unit 111.

As shown in FIG. 4B, the automatic image compositing unit 113 includes an image acquisition unit 411, an object detection unit 412, an attribute detection unit 413, and an image compositing unit 414.

The image acquisition unit 411 acquires images to be used in the generation of a composite image from the image storage unit 114 or another storage medium (e.g., a memory, a floppy (registered trademark) disk, a hard disk, a magnetic tape, a magneto-optical disk, or a nonvolatile memory card).

The object detection unit 412 executes target object detection on the images acquired by the image acquisition unit 411.

The attribute detection unit 413 detects an attribute of the target object detected by the object detection unit 412. In the present embodiment, in order to detect a person's face as the target object, the attribute detection unit 413 detects a facial attribute. Note that as described above, the facial attribute may be, for example, a facial expression such as a smile, sad face, or angry face; line of sight direction or face orientation; open/closed eyes; or a name specifying a person. A detailed description of the target object detection method and the attribute detection method will not be given here since they have already been described.

The image compositing unit 414 carries out compositing processing on the images acquired by the image acquisition unit 411 based on the compositing condition set by the automatic condition setting unit 111. The compositing processing can be carried out using a template that has been stored in advance as disclosed in Japanese Patent Laid-Open No. 2000-137789, for example. The compositing processing can also be carried out using an average expression model as disclosed in Japanese Patent Laid-Open No. 10-91808, for example. For example, according to such techniques, in the case where a face with closed eyes has been set as the compositing condition by the automatic condition setting unit 111, and an image with open eyes has been provided for compositing, compositing processing is used to generate an image of a face with open eyes from an image of a face with closed eyes that has been acquired by the image acquisition unit 411.

7. Flow of Automatic Image Compositing Processing

Next is a description of the flow of automatic image compositing processing performed by the automatic image compositing unit 113 with reference to FIG. 5B. FIG. 5B is a flowchart showing the flow of automatic image compositing processing.

As shown in FIG. 5B, when the automatic image compositing processing starts, in step S510 one image is selected from among compositing target images. For example, if the target object is a person's face, images including a person's face are set as the compositing target images, and one image is selected from among these compositing target images.

In step S511, compositing processing is performed on the image selected in step S510 based on a compositing condition set by the automatic condition setting unit 111. In step S512, it is determined whether the compositing processing has been executed on all of the compositing target images. If it has been determined that the compositing processing has been performed on all of the compositing target images, the procedure advances to step S513. However, if it has been determined that there is an image for which the compositing processing has not been executed, the procedure returns to step S510, and the next image is selected.

In step S513, the composite images are displayed by thumbnail display or the like, and the automatic image compositing processing is ended.

As is clear from the above description, the image processing apparatus of the present embodiment is configured so as to detect an attribute in an image designated by the user, and automatically set an execution condition such as an image search condition or an image compositing condition based on the detected attribute.

Accordingly, when setting an execution condition such as an image search condition or an image compositing condition, the need for the user to manually set settings individually is eliminated, and the user only needs to designate a desired image. This consequently enables significantly reducing the burden of the setting operations performed by the user, and enables setting an execution condition such as a search condition or a compositing condition intended by the user.

Second Embodiment

Although a configuration in which search processing or compositing processing is performed based on an execution condition that has been automatically set by the image processing apparatus is described in the first embodiment, the present invention is not limited to this. A configuration is possible in which, for example, imaging processing is performed by an imaging apparatus based on an execution condition that has been automatically set. The following is a detailed description of the present embodiment.

1. Overall Configuration of Imaging Apparatus

FIG. 6 is a diagram showing the overall configuration of an imaging apparatus (electronic still camera) 600 according to an embodiment of the present invention.

In FIG. 6, reference sign 601 denotes an imaging lens group, and reference sign 602 denotes a light quantity adjustment apparatus including an aperture apparatus and a shutter apparatus. Reference sign 603 denotes a CCD or CMOS imaging element that converts luminous flux that has passed through the imaging lens group and makes up a subject image into an electrical signal, and reference sign 604 denotes an analog signal processing circuit that performs clamp processing and gain processing on analog signal output from the imaging element 603. Reference sign 605 denotes an analog/digital (hereinafter, referred to as A/D) converter that converts output from the analog signal processing circuit 604 into a digital signal.

Reference sign 607 denotes a digital signal processing circuit that performs predetermined pixel interpolation processing and color conversion processing on data from the A/D converter 605 or data from a memory control circuit 606. The digital signal processing circuit 607 also performs predetermined arithmetic operations using captured image data.

Based on the results of the arithmetic operations, a system control circuit 612 performs TTL (Through-The-Lens) AF (Auto Focus) processing, AE (Auto Exposure) processing, and EF (Electronic pre-Flash) processing for controlling an exposure control circuit 613 and a focus control circuit 614.

The digital signal processing circuit 607 also performs predetermined arithmetic processing using captured image data, and performs TTL AWB (Auto White Balance) processing based on the obtained results of the arithmetic processing. The digital signal processing circuit 607 furthermore executes, on the captured image data, target object detection processing in which, for example, a person's face is detected, and also executes determination processing on the detected face, such as expression determination, line of sight direction determination processing, open/closed eyes determination processing, and determination processing regarding a name specifying a person. Note that an automatic condition setting unit 621 and an automatic imaging processing unit 622 of the present embodiment that execute various types of processing including the above-described determination processing are assumed to be realized in the digital signal processing circuit 607.

The memory control circuit 606 controls the analog signal processing circuit 604, the A/D converter 605, the digital signal processing circuit 607, a memory 608, and a digital/analog (hereinafter, referred to as D/A) converter 609. Accordingly, data resulting from A/D conversion performed by the A/D converter 605 is written to the memory 608 via the digital signal processing circuit 607 and the memory control circuit 606, or data resulting from A/D conversion performed by the A/D converter 605 is written to the memory 608 directly via the memory control circuit 606.

The memory 608 stores data to be displayed by a display apparatus 610, and the data stored in the memory 608 is output to the TFT-type or LCD-type display apparatus 610 via the D/A converter 609 and displayed. The memory 608 can also store still images and video images that have been captured, and is provided with sufficient memory capacity to store a predetermined number of still images or a predetermined length of video images. Accordingly, even in the case of capturing a panorama image or continuously shot images by capturing multiple still images in succession, a large number of images can be written to the memory 608 at high speed. The memory 608 can also be used as a work area for the system control circuit 612. Note that captured still images and video images may be written via an interface 611 to a storage medium such as a CD-ROM, a floppy (registered trademark) disk, a hard disk, a magnetic tape, a magneto-optical disk, or a nonvolatile memory card.

The display apparatus 610 functions as an electronic finder by successively displaying captured image data. The display apparatus 610 can also arbitrarily turn displaying on/off in accordance with an instruction from the system control circuit 612, and turning displaying off enables significantly reducing power consumption over the case where displaying is turned on. The display apparatus 610 also displays the operating state and messages using characters and images in accordance with the execution of a control program by the system control circuit 612.

Reference sign 611 denotes an interface with a storage medium such as a memory card or a hard disk. Image data and management information associated therewith can be exchanged with a peripheral device such as another computer or a printer using the interface 611. If the interface 611 is configured so as to be compliant with the PCMCIA card standard or the CF (Compact Flash (registered trademark)) card standard, connection with various types of communication cards is possible. Examples of various types of communication cards include a LAN card, a modem card, a USB card, an IEEE 1394 card, a P1284 card, an SCSI card, and a PHS communication card.

The system control circuit 612 controls operation of the imaging apparatus 600 as a whole. A memory in the system control circuit 612 stores constants, variables, programs, and the like for operations performed by the system control circuit 612 and for determination processing. Note that it is possible to change these constants, variables, and programs stored in the memory in the system control circuit 612 using a CD-ROM, a floppy (registered trademark) disk, a hard disk, a magnetic tape, a magneto-optical disk, or a nonvolatile memory card. Also, a configuration is possible in which data and programs for operations performed by the system control circuit 612 and for performing determination processing are executed by being loaded from the storage medium instead of being stored in the memory.

The exposure control circuit 613 controls the aperture apparatus and the shutter apparatus of the light quantity adjustment apparatus 602. The focus control circuit 614 controls focusing and zooming of the imaging lens group 601. The exposure control circuit 613 and the focus control circuit 614 are controlled using a TTL system, and are controlled by the system control circuit 612 using arithmetic operation results calculated by the digital signal processing circuit 607 performing arithmetic processing on captured image data.

2. Flow of Automatic Condition Setting Processing

Figure 8:
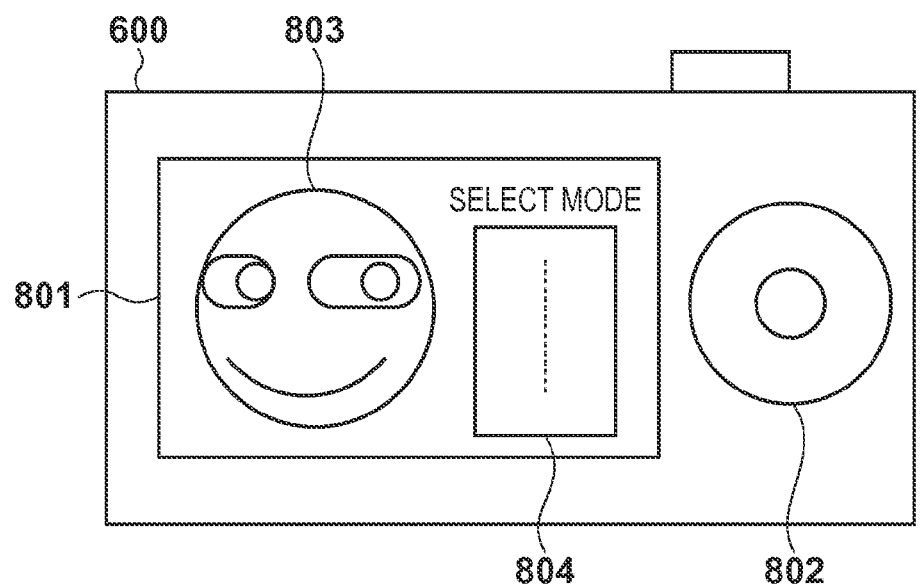
FIG. 8 is a diagram showing a display unit and an operation unit of the imaging apparatus.
Figure 9:
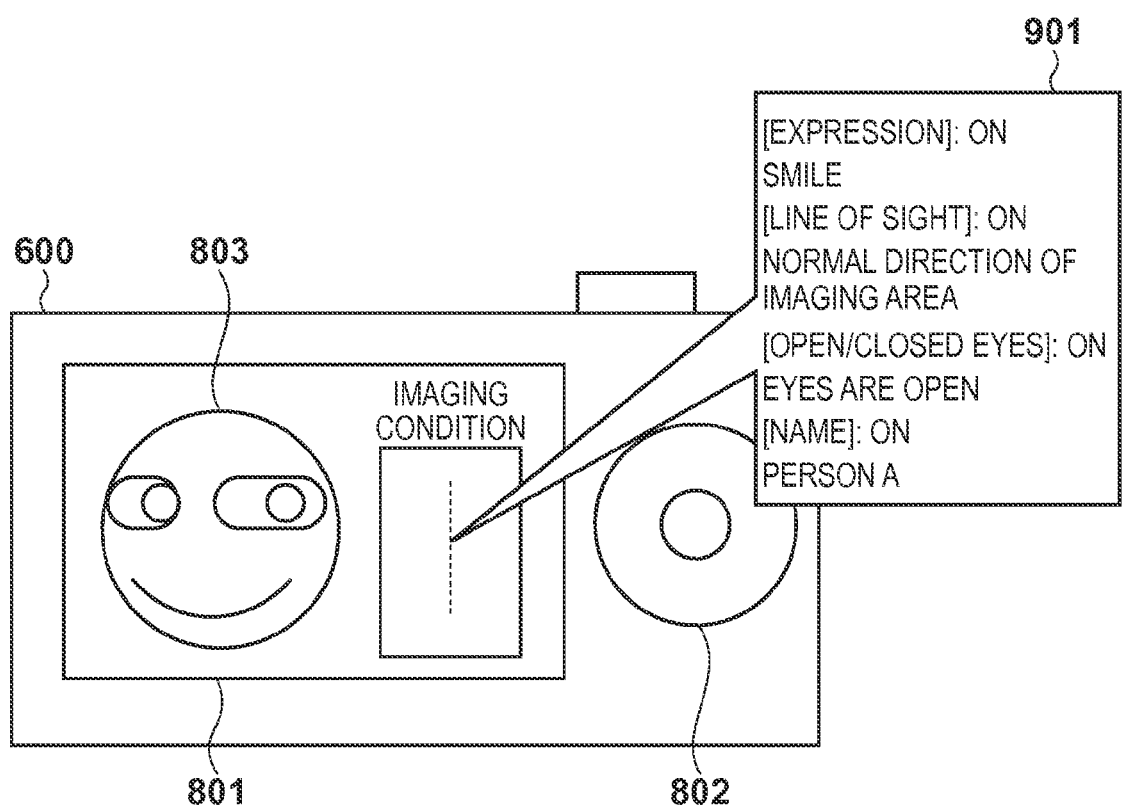
FIG. 9 is a flowchart showing imaging conditions set by automatic condition setting processing.
Figure 10:
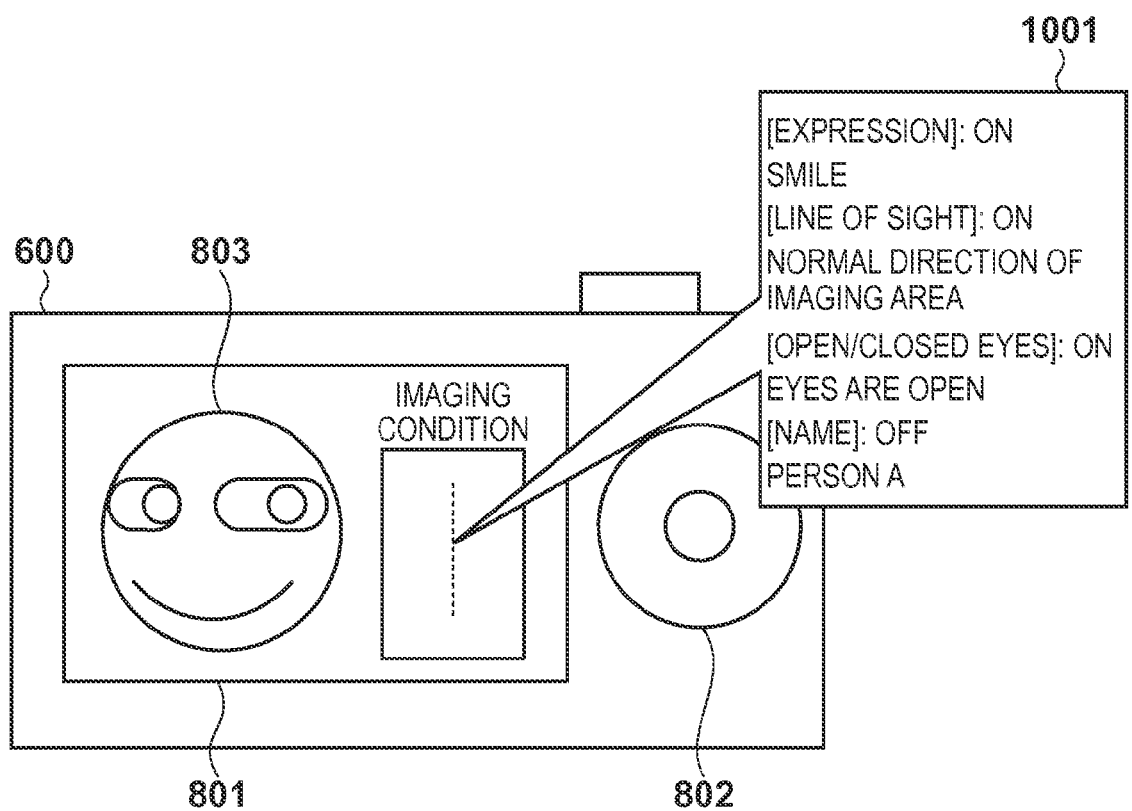
FIG. 10 is a diagram showing imaging conditions that have been changed by condition change processing.

Next is a description of the flow of automatic condition setting processing performed by the automatic condition setting unit 621 of the imaging apparatus 600 with reference to FIG. 7A to FIG. 10. FIG. 7A is a flowchart showing the flow of automatic condition setting processing, and FIGS. 8 to 10 are diagrams showing a user interface of the imaging apparatus 600.

As shown in FIG. 7A, when the automatic condition setting processing starts, in step S700 an automatic imaging condition setting mode is transitioned to based on a user instruction. Specifically, the automatic imaging condition setting mode for automatically setting an imaging condition is selected by the user with use of a display unit 801 and an operation unit 802 (FIG. 8) of the imaging apparatus 600, and thus the imaging apparatus 600 transitions to the automatic imaging condition setting mode.

When an automatic imaging condition setting mode 804 is selected in step S700, the automatic imaging condition setting mode is transitioned to. An image captured by the user is then acquired from the CCD or CMOS imaging element 603. Alternatively, an image selected by the user is acquired from the interface 611 with a storage medium such as a memory card or a hard disk. The acquired image is displayed by the display unit 801 shown in FIG. 8. Note that it is assumed that the user can arbitrarily select, via the operation unit 802, whether the image to be used in the automatic setting of an imaging condition is to be acquired from the CCD or CMOS imaging element 603 or to be acquired from the interface 611 with a storage medium such as a memory card or a hard disk.

In step S702, target object detection is executed on the image acquired in step S701. In step S703, an attribute is detected for the target object (face 803) detected in step S702. Here, in the present embodiment, the attribute may be, for example, a facial expression such as a smile, sad face, or angry face; line of sight direction or face orientation; open/closed eyes; or a name specifying a person. Note that the attribute is not intended to be limited to this.

In step S704, an imaging condition is automatically set based on the result of the detection of an attribute for the target object (face 803) in step S703. Note that attributes and set flags are displayed as character information by the display unit 801 as shown in FIG. 9, so as to be able to be checked by the user (see reference sign 901).

In this way, the configuration is such that in the setting of an imaging condition, automatic setting is performed based on attributes detected in an image designated by a user selection, rather than attributes being manually set individually, thus enabling significantly reducing the burden of setting operations for the user. Also, in the case where the user manually sets imaging conditions individually, it is difficult for the user to grasp what sort of image will be captured as a result of the setting. In contrast, employing a configuration in which the user is allowed to select an image as described above, the user can capture an intended image.

After automatic imaging condition setting ends in step S704, in step S705 an inquiry is made to the user as to whether the user wishes to manually change an automatically set imaging condition. Specifically, a message such as "Change imaging conditions?" is displayed by the display unit 801.

If the user gave an instruction for changing an imaging condition in step S705, the procedure moves to step S706. In step S706, change processing (condition change processing) for, for example, adding or deleting an imaging condition is performed. For example, as shown in FIG. 10, in the case where the user desires that the imaging conditions, namely that the facial expression is a smile, that the line of sight direction is the normal direction of the camera imaging area, and that the eyes are open, are to be set for people other than person A as well, the name flag is changed from ON to OFF. Accordingly, automatic imaging processing is performed if, for everyone, the facial expression is a smile, the line of sight direction is the normal direction of the camera imaging area, and the eyes are open (see reference sign 1001).

FIG. 7B is a flowchart showing details of the flow of this condition change processing (step S706). As shown in FIG. 7B, when the condition change processing starts, in step S710 it is determined whether the user has selected an attribute that is to be added as an imaging condition or deleted.

If it has been determined in step S710 that the user has selected an attribute, the procedure advances to step S711, in which it is determined whether the current flag of the attribute selected by the user is OFF. If it has been determined in step S711 that the current flag of the selected attribute is OFF, the procedure advances to step S712, in which the flag of that attribute is change to ON. However, if the current flag of the selected attribute is ON, the procedure advances to step S713, in which the flag of that attribute is changed to OFF.

In step S714, an inquiry is made to the user as to whether the condition change processing is to be ended. Specifically, a message such as "End imaging condition change mode?" is displayed by the display unit 801. If an instruction for ending the condition change processing has been received in step S714, the condition change processing is ended. However, if an instruction for ending the condition change processing has not been received, the procedure returns to step S710.

Meanwhile, if the user gave an instruction for not changing an imaging condition in step S705, the automatic condition setting processing is ended.

3. Flow of Automatic Imaging Processing

Figure 11:
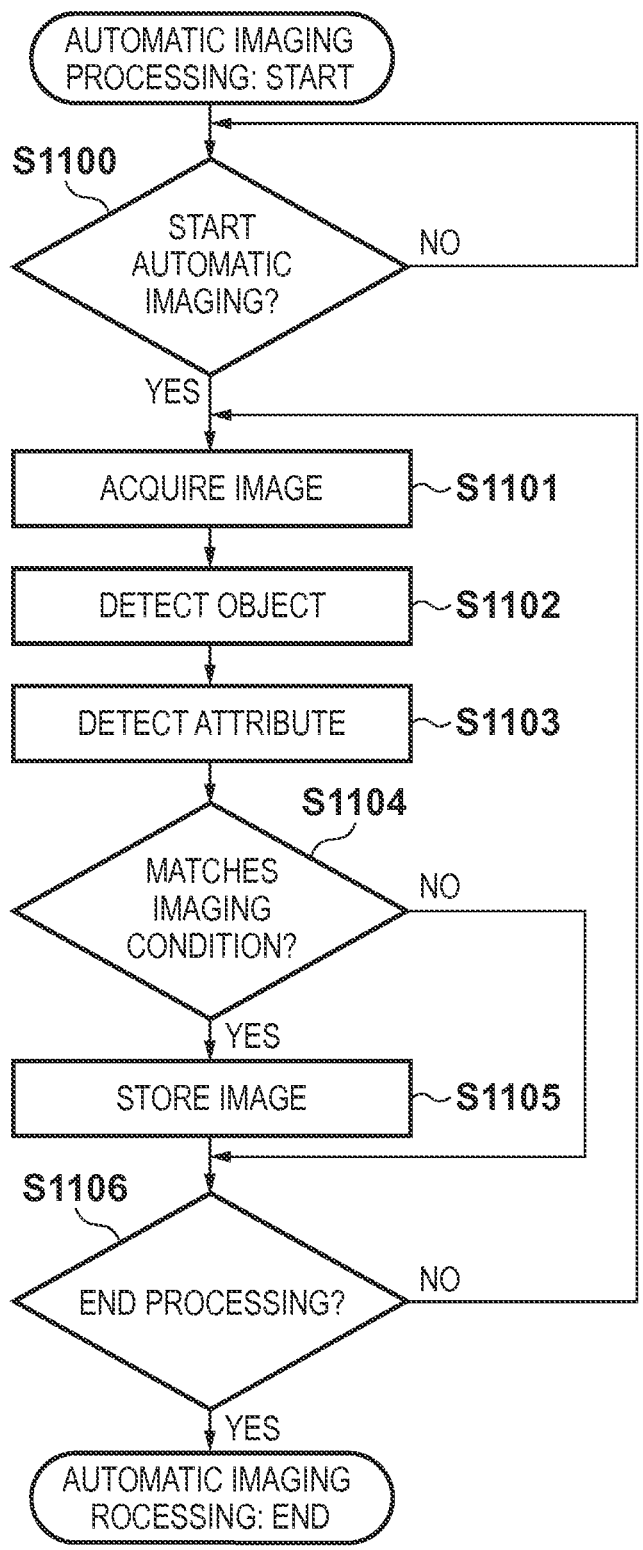
FIG. 11 is a flowchart showing the flow of automatic imaging processing.

Next is a description of the flow of automatic imaging processing for executing imaging processing based on an imaging condition set by the execution of the automatic condition setting processing, with reference to FIG. 11.

In step S1100, it is determined whether an instruction for starting automatic imaging processing has been received from the user. An instruction for starting the automatic imaging processing as referred to here means, for example, an operation in which a shutter button is pressed halfway. If it has been determined in step S1100 that an instruction for starting automatic imaging processing has been received, the procedure advances to step S1101, in which an image is acquired from the CCD or CMOS imaging element 603.

In step S1102, a predetermined target object is detected in the image acquired in step S1101. In the present embodiment, a person's face is detected as the predetermined target object. In step S1103, attribute detection is performed for the target object (person's face) detected in step S1102.

In step S1104, it is determined whether the attributes detected in step S1103 match the imaging conditions set in the automatic condition setting processing. For example, the determination as to whether the detected attributes match the imaging conditions is made by referencing a table including pairs of an attribute and a flag indicating whether the attribute was detected (ON/OFF), which were set as the imaging conditions.

If it has been determined in step S1104 that the detected attributes match the imaging conditions, storage processing is executed for storing the image acquired in step S1101 on a memory card via the interface 611. However, if it has been determined in step S1104 that the detected attributes do not match the imaging conditions, the procedure advances to step S1106.

In step S1106, it is determined whether the user has given an instruction for ending the automatic imaging processing, and the automatic imaging processing is ended if it has been determined that such an instruction was given. However, if it has been determined that the user has not given an instruction for ending the automatic imaging processing, the procedure returns to step S1101.

As is clear from the above description, the imaging apparatus of the present embodiment is configured so as to detect an attribute in an image designated by the user, and automatically set an imaging condition for capturing an image based on the detected attribute.

Accordingly, when setting an imaging condition for capturing an image, the need for the user to manually set settings individually is eliminated, and the user only needs to designate a desired image. This consequently enables significantly reducing the burden of the setting operations performed by the user, and enables capturing an image intended by the user.

Third Embodiment

In the configuration described in the second embodiment, if a detected attribute is greater than or equal to a predetermined threshold value in automatic condition setting processing, the flag of that attribute is set to ON. However, if an imaging condition has been set in this way, consequently a determination as to whether the detected attribute is greater than or equal to a predetermined threshold value is made in automatic imaging processing. However, a detected attribute is normally not binary data, but rather is often multi-value data indicating that changes are continuous. For this reason, it is desirable that a value set as an imaging condition is also multi-value data (instead of being binary data indicating ON/OFF). Further, a type of a person's facial expression or a name etc may be set as an imaging condition.

In view of this, in the configuration of the present embodiment, multi-value data can be set as an imaging condition in the automatic setting of imaging conditions in automatic condition setting processing. The following is a detailed description of the present embodiment. Note that a description of the overall configuration of an imaging apparatus of the present embodiment has been omitted since it is similar to that described in the second embodiment.

1. Flow of Automatic Condition Setting Processing

First is a description of the flow of automatic condition setting processing of the present embodiment with reference to FIG. 7A.

In the automatic condition setting processing of the present embodiment, the processing from steps S700 to S703 is similar to the automatic condition setting processing of the second embodiment, and therefore a description of the processing of these steps will not be given.

In step S704, a value in accordance with an attribute detected in step S703 (hereinafter, referred to as an "attribute value") is set as the imaging condition. Specifically, if the detected attribute is smiling, and furthermore the smile level is high, an attribute value indicating that the smile level is high is set.

Figure 12:
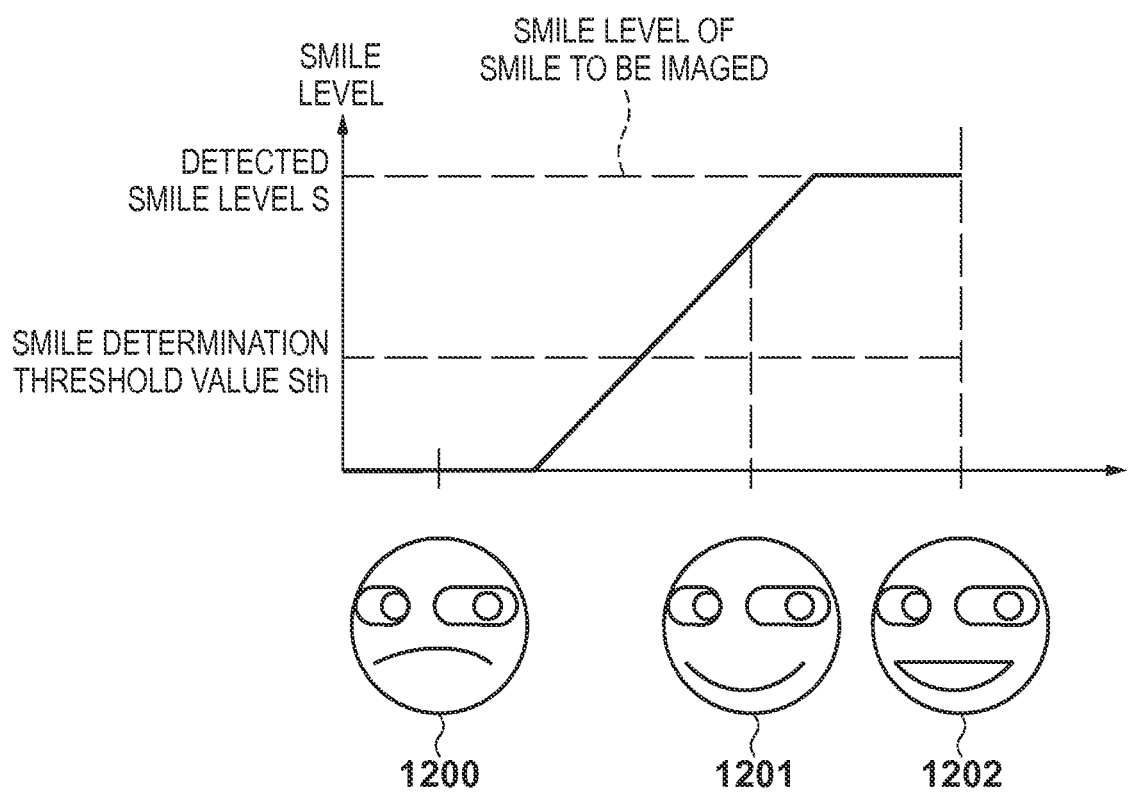
FIG. 12 is a diagram showing a relationship between binary (smiling, not-smiling) determination threshold values and shift in smile level.

FIG. 12 is a graph showing a threshold value Sth that has been set in advance and is used in the binary determination of smiling or not-smiling, detected smile levels S, and faces 1200 to 1202 respectively corresponding to the smile levels. If simply smiling has been set as the imaging condition, an image capturing is performed when it has been determined that a person is smiling. In other words, it is possible for an image of the face 1201 having a low smile level to be captured.

In contrast, if an attribute value has been set as the imaging condition, not only is a determination made regarding the smiling attribute, but also a determination regarding the smile level is made, and therefore only an image of, for example, the face 1202 having a high smile level can be captured. Note that details of the condition setting processing (step S704) of the present embodiment will be described later.

Let us now return to the description of FIG. 7A. In step S705, an inquiry is made to the user as to whether the user wishes to manually change an automatically set imaging condition. If the user gave an instruction for changing an imaging condition in step S705, the procedure moves to step S706. In step S706, condition change processing for, for example, adding or deleting an imaging condition is performed. Note that in the case of the present embodiment, the imaging conditions automatically set in step S704 include both attributes for which flags are set ON/OFF and attributes for which attribute values are set. Accordingly, in the condition change processing in step S706, change processing is executed in accordance with the attributes (note that details of the condition change processing (step S706) of the present embodiment will be given later).

Meanwhile, if the user gave an instruction for not changing an imaging condition in step S705, the automatic condition setting processing is ended.

2. Flow of Condition Setting Processing

Figure 13:
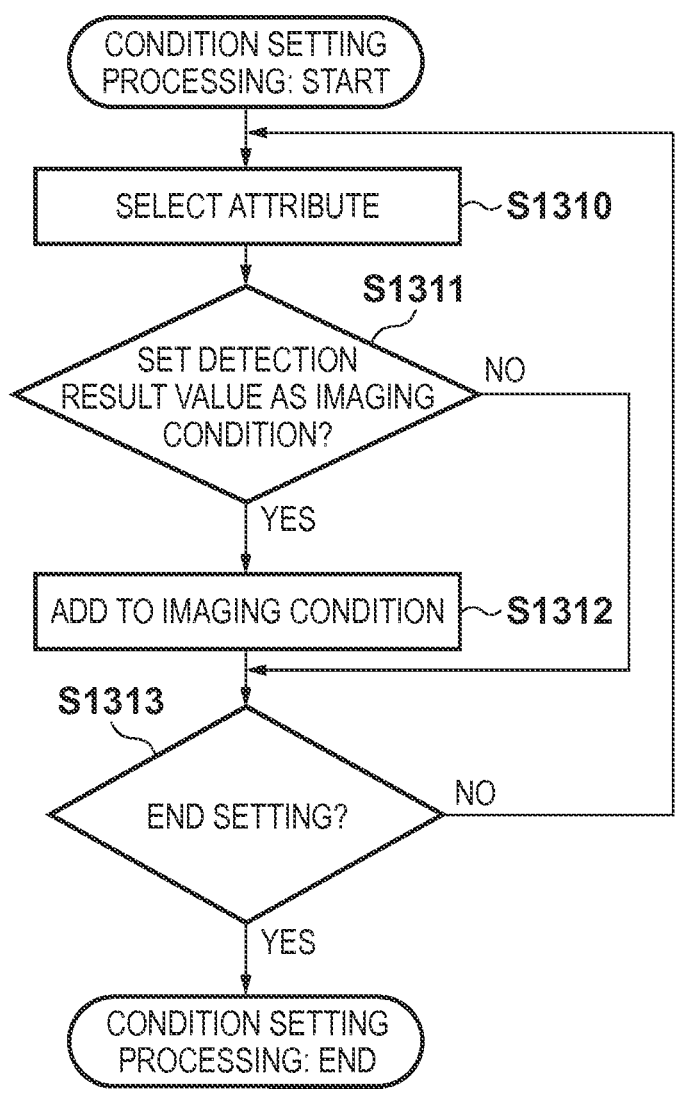
FIG. 13 is a flowchart showing the flow of condition setting processing.

FIG. 13 is a flowchart showing the flow of condition setting processing (step S704) of the present embodiment.

In step S1310, one attribute indicated by a user instruction is selected from among the various attributes detected in step S703.

In step S1311, it is determined whether the selected attribute value detected in step S703 is to be set as an imaging condition. If an instruction for setting the attribute value selected in step S703 as an imaging condition has been input, the procedure advances to step S1312, in which the attribute value detected in step S703 is set as an imaging condition. However, if an instruction for not setting the attribute value detected in step S703 as an imaging condition has been input, the procedure advances to step S1313.

In step S1313, it is determined whether the determination regarding setting as an imaging condition has been made for all of the attribute values detected in step S703, and if there is an attribute value for which the determination regarding setting as an imaging condition has not been made, the procedure returns to step S1310. On the other hand, if the determination regarding setting as an imaging condition has been made for all of the attribute values, the condition setting processing ends.

3. Flow of Condition Change Processing

Figure 14:
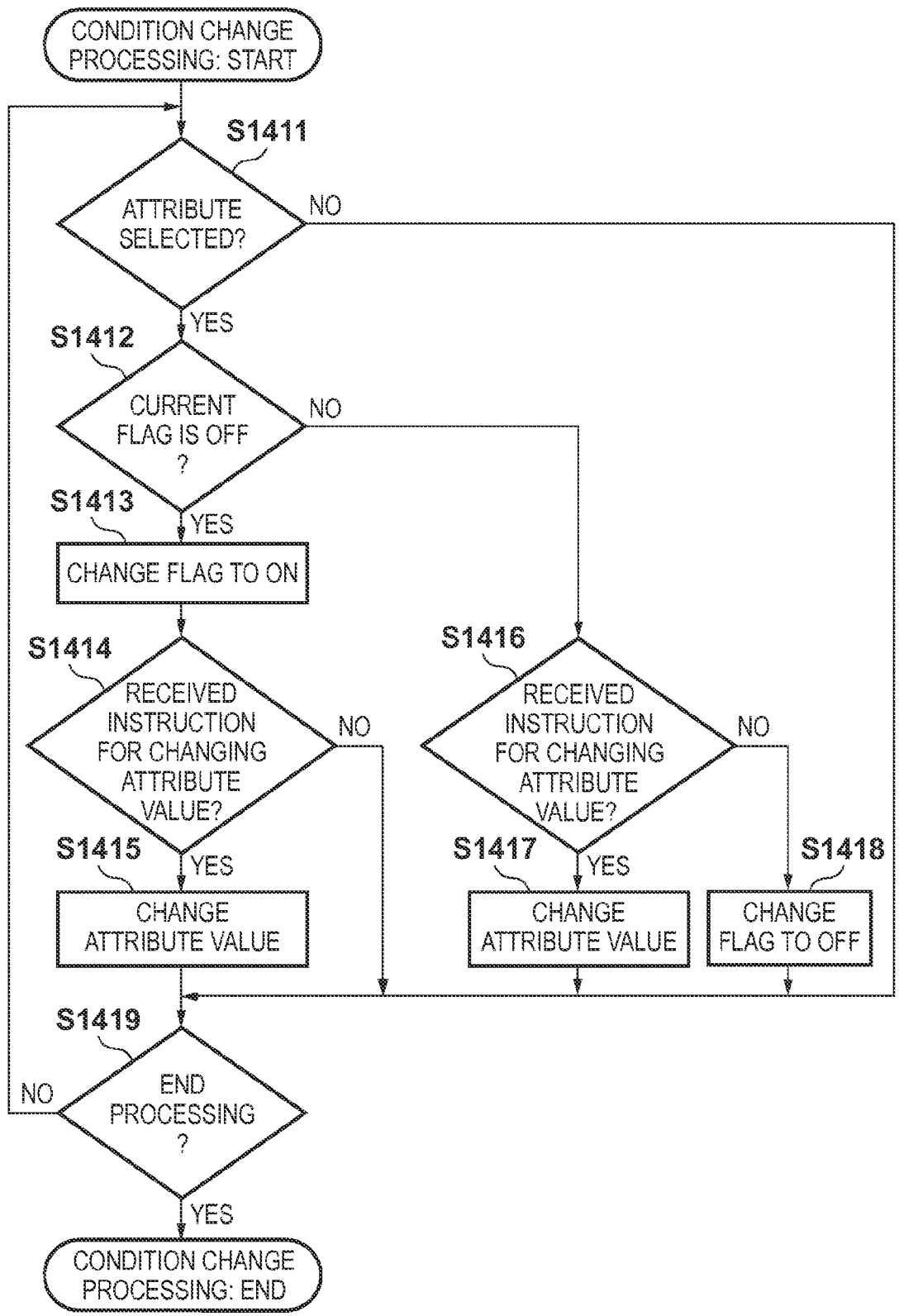
FIG. 14 is a flowchart showing the flow of condition change processing.

FIG. 14 is a flowchart showing the flow of condition change processing (step S706) of the present embodiment.

In step S1411, it is determined whether the user has selected an attribute to be added or deleted or an attribute whose attribute value is to be changed. If it has been determined in step S1411 that an attribute has been selected, the procedure advances to step S1412.

In step S1412, it is determined whether the flag of the selected attribute is OFF. If it has been determined that the flag of the selected attribute is OFF, the procedure advances to step S1413, in which the flag is changed to ON, and thereafter the procedure advances to step S1414.

In step S1414, an inquiry is made to the user as to whether the user wishes to change the attribute value as well, and an instruction is received from the user in response to the inquiry. Specifically, a message such as "Change attribute value as well?" is displayed by the display unit 801, and an instruction is received from the user in response to the message.

If it has been determined in step S1414 that an instruction for changing the attribute value was received, the procedure advances to step S1415, in which the attribute value is changed. For example, the attribute value may be changed using the attribute value detected in step S703, or the attribute value may be changed manually by the user.

On the other hand, if it has been determined in step S1414 that an instruction for changing the attribute value was not received, the procedure advances to step S1419.

Meanwhile, if it has been determined in step S1412 that the flag of the selected attribute is not OFF, the procedure advances to step S1416. In step S1416, an inquiry is made to the user as to whether the user wishes to change the attribute value, and an instruction is received from the user in response to the inquiry. Specifically, a message such as "Change attribute value as well?" is displayed by the display unit 801, and an instruction is received from the user in response to the message.

If it has been determined in step S1416 that an instruction for changing the attribute value was received, the procedure advances to step S1417, in which the attribute value is changed. For example, the attribute value may be changed using the attribute value detected in step S703, or the attribute value may be changed manually by the user.

Figure 15:
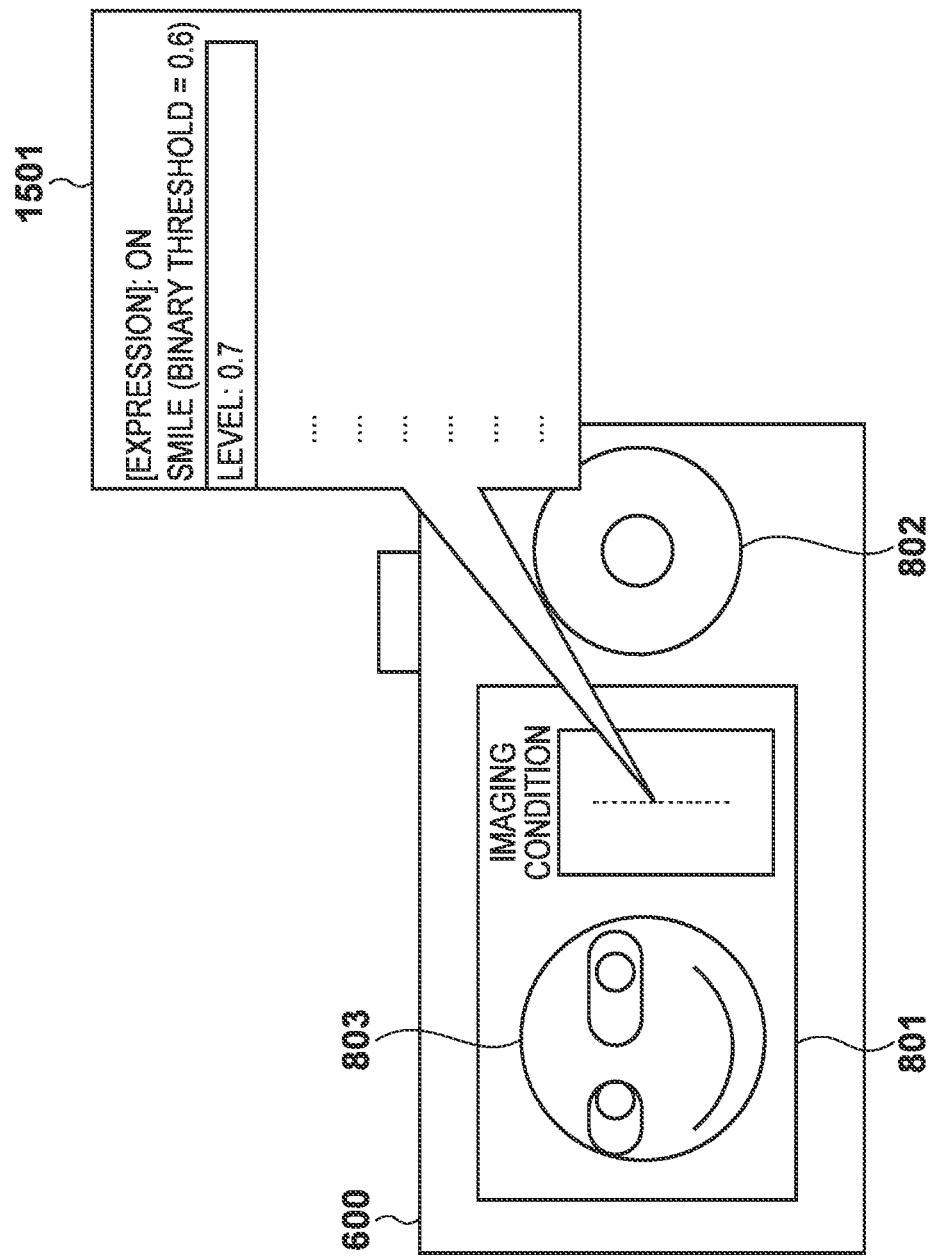
FIG. 15 is a diagram showing imaging conditions that have been changed by condition change processing.
Figure 16:
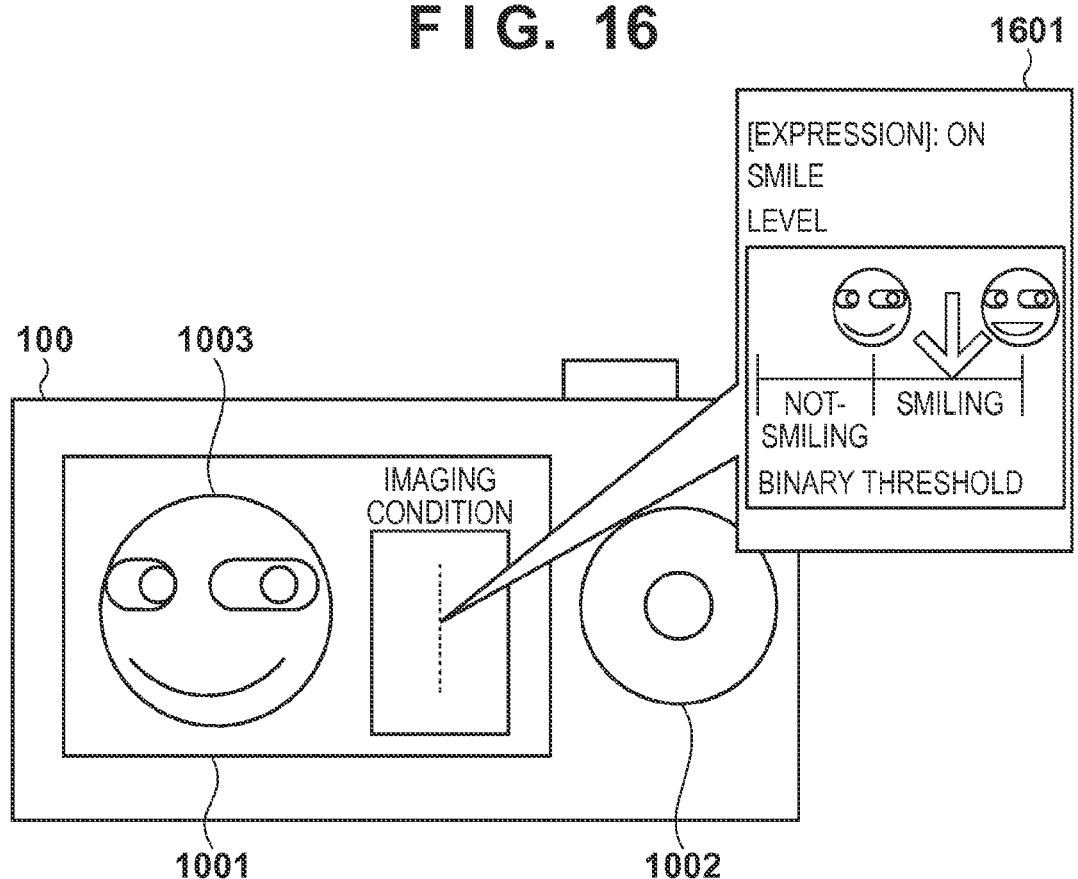
FIG. 16 is a diagram showing the case where an attribute value changed by condition change processing is displayed using a number line.

Note that in the case where the user manually changes an attribute value, the user directly changes an attribute value such as the smile level as shown in FIG. 15 (see reference sign 1501), for example. Alternatively, a configuration is possible in which a display including a combination of a number line graph or the like and emoticons is presented, and the attribute value is changed by moving an indicator such as an arrow, as shown in FIG. 16 (see reference sign 1601). In this way, by the user changing an attribute value such as the smile level, a face with a lower smile level than the face 1201 or a face with a higher smile level can be set as an imaging condition.

Meanwhile, if it has been determined in step S1416 that an instruction for changing the attribute value was not received, the procedure advances to step S1418, in which the flag of the attribute selected in step S1411 is changed to OFF.

In step S1419, an inquiry is made to the user as to whether the condition change processing is to be ended, and an instruction is received from the user. Specifically, a message such as "End imaging condition modification?" is displayed by the display unit 801, and an instruction is received from the user in response to the message. If it has been determined in step S1419 that an instruction for ending the condition change processing was received, the condition change processing is ended. On the other hand, if it has been determined that an instruction for continuing the condition change processing was received, the procedure returns to step S1411, and the next attribute is selected.

4. Flow of Automatic Imaging Processing

Next is a description of the flow of automatic imaging processing of the present embodiment with reference to FIG. 11. In the automatic imaging processing of the present embodiment, the processing from steps S1100 to S1103 is similar to the automatic imaging processing of the second embodiment, and therefore a description of the processing of these steps will not be given.

In step S1104, it is determined whether the attributes detected in step S1103 match the imaging conditions set in the automatic condition setting processing or the imaging conditions changed in the condition change processing. Specifically, it is determined not only whether the flag of each attribute is ON/OFF, but also whether the attribute value of each attribute matches the set attribute.

If it has been determined in step S1104 that the detected attributes match the set (or changed) imaging conditions, storage processing is executed for storing the image acquired in step S1101 on a memory card via the interface 611. However, if it has been determined in step S1104 that the detected attributes do not match the set (or changed) imaging conditions, the procedure advances to step S1106.

In step S1106, it is determined whether the user has instructed the ending of the automatic imaging processing, and the automatic imaging processing is ended if it has been determined that such an instruction was received. However, if it has been determined that the user has not given an instruction for ending the automatic imaging processing, the procedure returns to step S1100.

As is clear from the above description, the imaging apparatus of the present embodiment is configured so as to enable automatically setting not only an attribute, but also an attribute value corresponding to the attribute as an imaging condition.

Accordingly, when setting an imaging condition for capturing an image, it is possible to set an imaging condition that is closer to the imaging condition intended by the user, compared to the imaging apparatus of the second embodiment.

Note that the execution condition set by the automatic condition setting processing of the present embodiment may be used as not only an imaging condition, but also as an image search condition.

Fourth Embodiment

Figure 17:
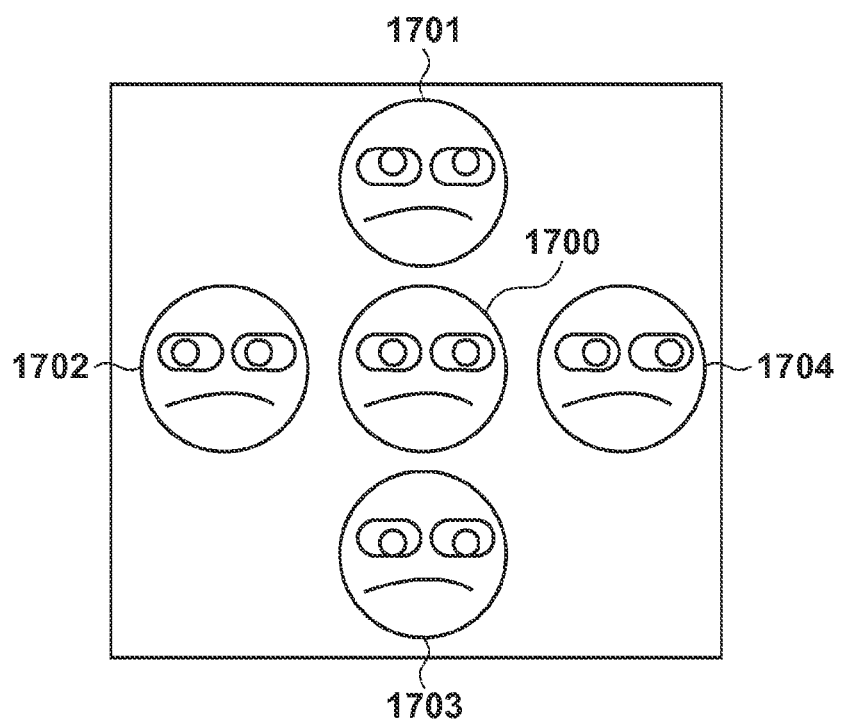
FIG. 17 is a diagram showing an example of a predetermined range of line of sight directions that has been set as an imaging condition.

Although a configuration in which not only an attribute, but also an attribute value are automatically set as an imaging condition in automatic condition setting processing is described in the third embodiment, the present invention is not limited to this. For example, a predetermined range may be provided for an attribute value, and the predetermined range may be set as an imaging condition. This is because in the case where the target object is a person's face, a setting can be said to be preferable as an imaging condition if, for example, the attribute value for the line of sight direction is in a predetermined range as indicated by 1700 to 1704 in FIG. 17. Based on such an imaging condition, imaging processing is executed if the line of sight direction is within the predetermined range. The following is a detailed description of the present embodiment.

1. Flow of Automatic Condition Setting Processing

First is a description of the flow of automatic condition setting processing of the present embodiment with reference to FIG. 7A.

In the automatic condition setting processing of the present embodiment, the processing from steps S700 to S703 is similar to the automatic condition setting processing of the second embodiment, and therefore a description of the processing of these steps will not be given.

Figure 18:
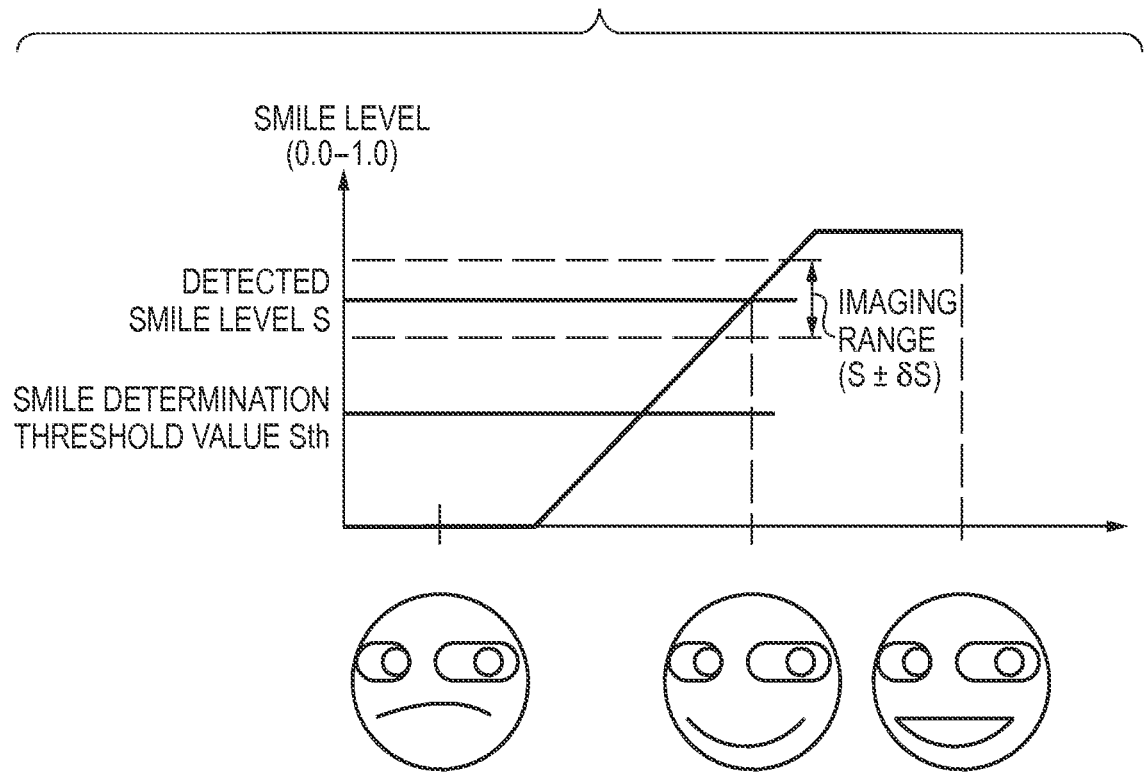
FIG. 18 is a diagram showing a relationship between binary (smiling, not-smiling) determination threshold values and predetermined ranges of smile levels.

In step S704, it is determined whether the attribute detected in step S703 and a predetermined range for the attribute are to be set as an imaging condition. Specifically, in the case where the detected attribute is smiling, a predetermined range (S±δS) is set based on the detected attribute value (smile level S), as shown in FIG. 18.

Also, if the detected attribute value is line of sight direction, a predetermined range of line of sight directions in the pan direction (θp±δθp) is set as an imaging condition based on the detected line of sight direction θp, as shown in FIG. 19 (only the pan direction is displayed). Similarly, although not shown in FIG. 19, a predetermined range of line of sight directions in the tilt direction (θt±δθt) is set as an imaging condition.

Note that in step S704, a predetermined range is not set for attributes for which a predetermined range cannot be set, such as a name specifying a person. Note that details of the condition setting processing (step S704) of the present embodiment will be described later.

Let us now return to the description of FIG. 7A. In step S705, an inquiry is made to the user as to whether the user wishes to manually change an automatically set imaging condition. If the user gave an instruction for changing an imaging condition in step S705, the procedure moves to step S706. In step S706, condition change processing for, for example, adding or deleting an imaging condition is performed. Note that in the case of the present embodiment, the imaging conditions automatically set in step S704 include both attributes for which flags are set ON/OFF and attributes for which attribute values are set. Accordingly, in the condition change processing in step S706, change processing is executed in accordance with the attributes (note that details of the condition change processing (step S706) of the present embodiment will be given later).

Meanwhile, if the user gave an instruction for not changing an imaging condition in step S705, the automatic condition setting processing is ended.

2. Flow of Condition Setting Processing

Figure 20:
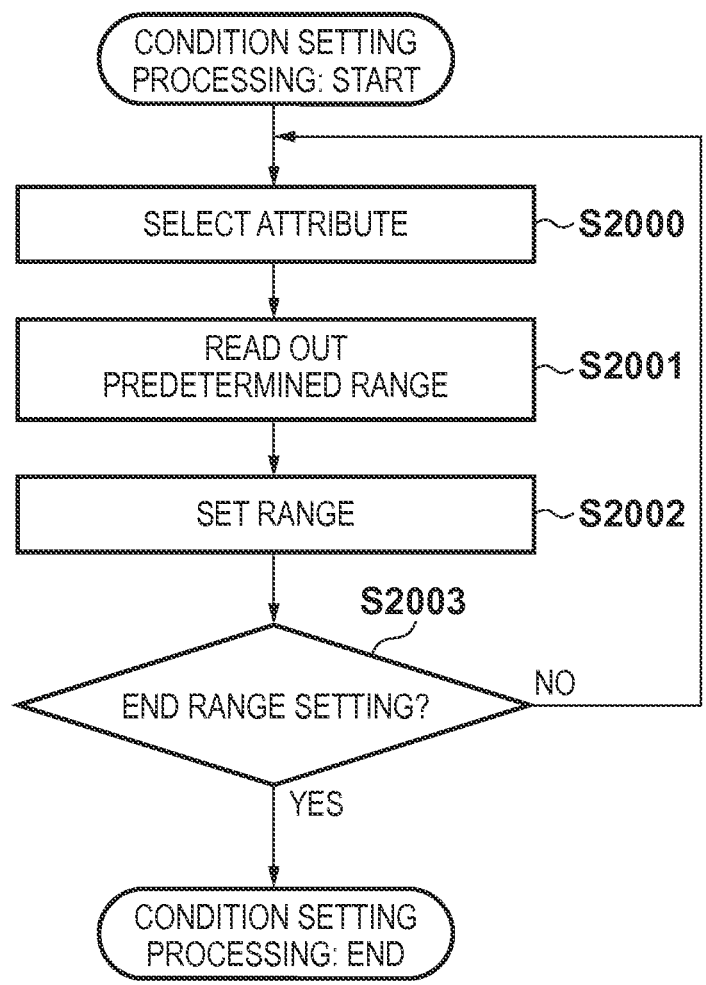
FIG. 20 is a flowchart showing the flow of condition setting processing.

FIG. 20 is a flowchart showing the flow of condition setting processing (step S704) of the present embodiment.

In step S2000, one attribute is selected from among the various attributes detected in step S703.

In step S2001, a predetermined range corresponding to the attribute selected in step S2000 is read out from a dictionary that has been provided in advance. Specifically, in the case where the attribute selected in step S2000 is smiling, the value of δS is read out, and in the case where the selected attribute is line of sight direction, the values of δθp and δθt are read out.

In step S2002, a predetermined range is set for the attribute selected in step S2000 using the attribute value detected in step S703 and the values read out in step S2001. Specifically, in the case where the attribute selected in step S2000 is smiling, the predetermined range (S±δS) is set for the smile level, and in the case where the selected attribute is line of sight direction, the predetermined ranges (θp±δθp) and (θt±δθt) are set for the line of sight directions in the pan and tilt directions. Note that the result of automatically setting the attribute detected in step S703 and the predetermined range corresponding to the attribute as an imaging condition is displayed by the display unit 801 as indicated by reference sign 2101 in FIG. 21.

In step S2003, it is determined whether the setting of a predetermined range has ended for all of the attribute values (all of the attribute values for which a predetermined range can be set) detected in step S703, and if it has been determined that there is an attribute for which a predetermined range has not been set, the procedure returns to step S2000. On the other hand, if it has been determined that the setting of a predetermined range has ended for all of the attribute values, the condition setting processing ends.

3. Flow of Condition Change Processing

Next is a description of the flow of condition change processing (step S706) of the present embodiment with reference to FIG. 14.

Figure 21:
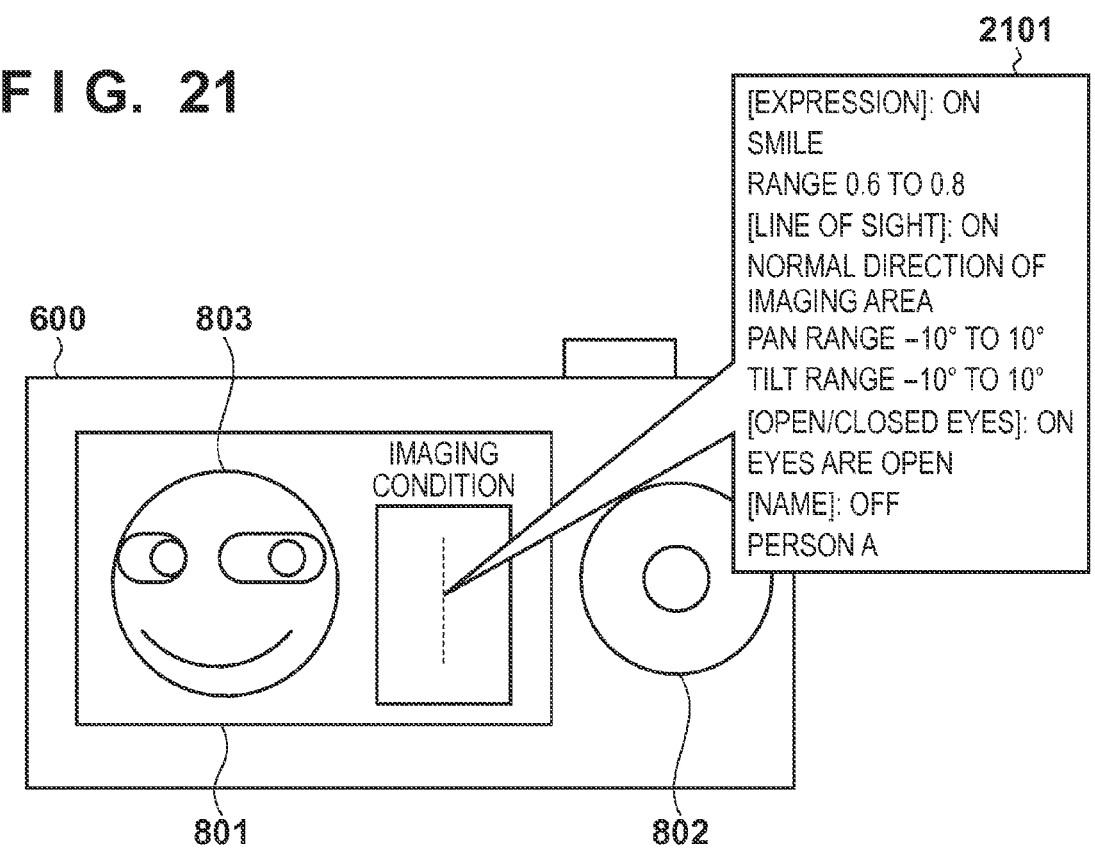
FIG. 21 is a diagram showing the case where a predetermined range changed by condition change processing is displayed using numbers.
Figure 22:
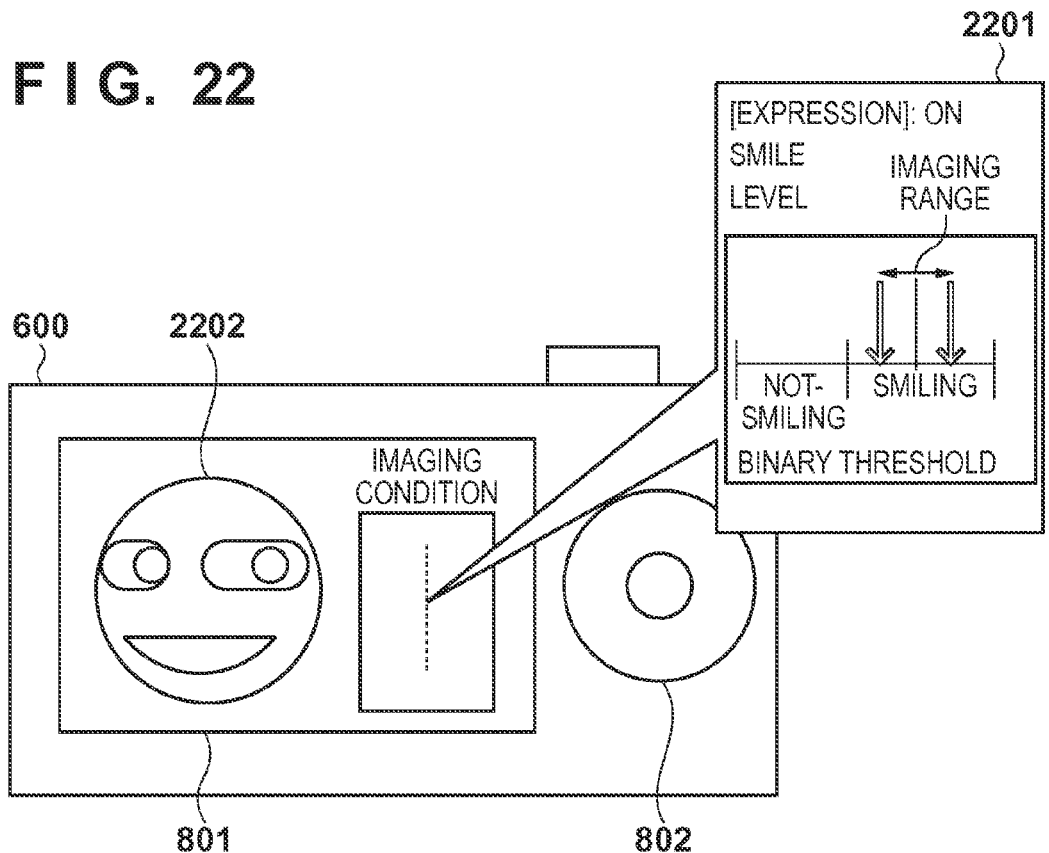
FIG. 22 is a diagram showing the case where a predetermined range changed by condition change processing is displayed using a number line.

The condition change processing of the present embodiment is basically the same as the condition change processing described with reference to FIG. 14 in the third embodiment. Note that in the case where the user manually adjusts the predetermined range setting in step S1417, the predetermined range for an attribute value such as the smile level may be directly changed as shown in FIG. 21 (see reference sign 2101). Alternatively, a configuration is possible in which a display including a number line graph or the like is presented, and the predetermined range is changed by moving indicators such as arrows, as shown in FIG. 22 (see reference sign 2201).

Alternatively, a configuration is possible in which compositing processing is performed on images obtained in step S701, and the composite image is displayed, as disclosed in Japanese Patent Laid-Open No. 2000-137789 and Japanese Patent Laid-Open No. 10-91808. Note that the method of changing a predetermined range setting to serve as an imaging condition is not limited to the above examples.

4. Flow of Automatic Imaging Processing

Next is a description of the flow of automatic imaging processing of the present embodiment with reference to FIG. 11. In the automatic imaging processing of the present embodiment, the processing from steps S1100 to S1103 is similar to the automatic imaging processing of the second embodiment, and therefore a description of the processing of these steps will not be given.

In step S1104, it is determined whether the attributes detected in step S1103 match the imaging conditions set in the automatic condition setting processing or the imaging conditions changed in the condition change processing. Specifically, it is determined not only whether the flag of each attribute is ON/OFF, but also whether the attribute value of each attribute lies in the set predetermined range.

If it has been determined in step S1104 that the detected attributes match the set (or changed) imaging conditions, storage processing is executed for storing the image acquired in step S1101 on a memory card via the interface 611. However, if it has been determined in step S1104 that the detected attributes do not match the set (or changed) imaging conditions, the procedure advances to step S1106.

In step S1106, it is determined whether the user has instructed the ending of the automatic imaging processing, and the automatic imaging processing is ended if it has been determined that such an instruction was received. However, if it has been determined that the user has not given an instruction for ending the automatic imaging processing, the procedure returns to step S1100.

As is clear from the above description, the imaging apparatus of the present embodiment is configured so as to enable automatically setting not only an attribute as an imaging condition, but also a predetermined range for the attribute.

Accordingly, when setting an imaging condition for capturing an image, it is possible to set an imaging condition that is closer to the imaging condition intended by the user, compared to the imaging apparatus of the second embodiment.

Note that the execution condition set by the automatic condition setting processing of the present embodiment may be used as not only an imaging condition, but also as an image search condition.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-182589 filed Aug. 17, 2010, which is hereby incorporated by reference herein in its entirety.

What is claimed is:

1. An imaging apparatus that executes recording processing for recording an image captured by an imaging unit in a storage unit, comprising:

an acquisition unit configured to, in a condition setting mode for setting an execution condition for the recording processing, acquire a plurality of sample images and configured to, in a recording mode for executing the recording processing, acquire a captured image;

a detection unit configured to, in the condition setting mode, detect objects from the plurality of sample images and configured to, in the recording mode for executing the recording processing, detect an object from the captured image;

an attribute determination unit configured to, in the condition setting mode, determine a type of common attribute which is common to at least a predetermined ratio of the objects detected from the plurality of acquired sample images and configured to, in the recording mode for executing the recording processing, determine an attribute of the object detected from the captured image;

a condition setting unit configured to, in the condition setting mode, set the determined type of common attribute as an execution condition for execution of the recording processing;

a condition determination unit configured to, in the recording mode for executing the recording processing, determine whether the attribute of the object detected from the captured image matches the determined type of common attribute which is set as the execution condition; and an execution unit configured to record, in the recording mode, the captured image in a memory if the attribute of the object detected from the captured image matches the determined type of common attribute.

2. The imaging apparatus according to claim 1, wherein the attribute determination unit determines, in the condition setting mode, whether the object has a predetermined attribute by comparing a feature quantity indicating a feature of the detected object with a predetermined threshold value, and the condition setting unit sets, in the condition setting mode, a result of the determination for the predetermined attribute as an execution condition for the recording processing.

3. The imaging apparatus according to claim 2, wherein the attribute determination unit determines, in the condition setting mode, whether the object has each of a plurality of attributes by comparing a feature quantity indicating a feature of each of the plurality of attributes of the detected object with a predetermined threshold value corresponding to each of the plurality of attributes.

4. The imaging apparatus according to claim 2, wherein the attribute determination unit determines, in the condition setting mode, corresponding attribute value from the feature quantity indicating the feature of the detected object and the condition setting unit further sets, in the condition setting mode, the attribute value or a predetermined range including the attribute value as an execution condition of the recording processing.

5. The imaging apparatus according to claim 1, further comprising a change unit configured to change the execution condition for the recording processing that was set by the condition setting unit.

6. The imaging apparatus according to claim 1, wherein the object is a person's face and a person's facial expression, at least one of a line of sight direction, a face orientation, an open/closed eye state, and a name are included as attributes.

7. The image processing apparatus according to claim 6, wherein in a case where a plurality of images have been displayed based on an instruction from a user, the condition setting unit sets, among the determined attributes, the common attribute that is common to each of the displayed images as the execution condition for the recording processing.

8. An imaging method in a recording apparatus that executes recording processing for recording an image captured by an imaging unit in a storage unit, comprising:
 a first acquisition step of acquiring, in a condition setting mode for setting an execution condition for the recording processing, a plurality of sample images;
 a first detection step of detecting, in the condition setting mode, objects from the plurality of sample images;
 a first attribute determination step of determining, in the condition setting mode, a type of common attribute which is common to at least a predetermined ratio of the detected objects from the plurality of sample images;
 a condition setting step of setting, in the condition setting mode, the determined type of common attribute as an execution condition for execution of the recording processing;
 a second acquisition step of acquiring, in a recording mode for executing the recording processing, a captured image;
 a second detection step of detecting, in the recording mode, an object from the captured image;
 a second attribute determination step of determining, in the recording mode, an attribute of the object detected from the captured image;
 a condition determination unit step of determining, in the recording mode, whether the attribute of the object detected from the captured image matches the determined type of common attribute which is set as the execution condition; and
 an execution step of recording, in the recording mode, the captured image in a memory if the attribute of the object detected from the captured image matches the determined type of common attribute.

9. A non-transitory computer-readable medium encoded with a computer readable program which, when executed by a processor, will cause a computer to execute the imaging method according to claim 8.

* * * * *